US011859584B2

(12) United States Patent
Nakai et al.

(10) Patent No.: US 11,859,584 B2
(45) Date of Patent: Jan. 2, 2024

(54) SOLENOID VALVE CONTROL DEVICE

(71) Applicant: Hitachi Astemo, Ltd., Hitachinaka (JP)

(72) Inventors: Hirotaka Nakai, Hitachinaka (JP); Osamu Mukaihara, Hitachinaka (JP); Toshihiro Aono, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/925,627

(22) PCT Filed: Feb. 5, 2021

(86) PCT No.: PCT/JP2021/004256
§ 371 (c)(1),
(2) Date: Nov. 16, 2022

(87) PCT Pub. No.: WO2021/245984
PCT Pub. Date: Dec. 9, 2021

(65) Prior Publication Data

US 2023/0193867 A1 Jun. 22, 2023

(30) Foreign Application Priority Data

Jun. 3, 2020 (JP) ................................ 2020-097072

(51) Int. Cl.
*F02M 59/36* (2006.01)
*F02D 41/34* (2006.01)
*F02D 45/00* (2006.01)

(52) U.S. Cl.
CPC ........... *F02M 59/366* (2013.01); *F02D 41/34* (2013.01); *F02D 45/00* (2013.01)

(58) Field of Classification Search
CPC ...... F02M 59/366; F02M 59/36; F02D 41/34; F02D 45/00
See application file for complete search history.

(56) References Cited

U.S. PATENT DOCUMENTS

| | | | | |
|---|---|---|---|---|
| 5,094,216 | A | 3/1992 | Miyaki et al. | |
| 8,444,060 | B2 * | 5/2013 | Yan | G01F 22/02 239/71 |

(Continued)

FOREIGN PATENT DOCUMENTS

| | | | |
|---|---|---|---|
| JP | 1-100323 A | 4/1989 | |
| JP | 2017-75609 A | 4/2017 | |
| JP | 2017-214852 A | 12/2017 | |

OTHER PUBLICATIONS

International Search Report (PCT/ISA/210) issued in PCT Application No. PTC/JP2021/004256 dated Jun. 1, 2021 with English translation (four (4) pages).

(Continued)

*Primary Examiner* — Joseph J Dallo
(74) *Attorney, Agent, or Firm* — Crowell & Moring LLP

(57) ABSTRACT

Provided is a solenoid valve control device capable of detecting a motion of a valve body in response to a drive command without adding a special circuit.

According to the present invention, a solenoid valve control device controls opening and closing of a solenoid valve in an internal combustion engine system including: a fuel pump including a plunger that that increases or decreases a volume of a pressurizing chamber by moving up and down with rotation of a pump drive cam, a solenoid valve for sucking fuel into the pressurizing chamber, and a discharge valve for discharging fuel in the pressurizing chamber; and a fuel rail (common rail) that accumulates fuel discharged by the fuel pump. The solenoid valve control device includes a control unit that determines whether or not closing of the solenoid valve has succeeded based on fuel pressure 604 of the fuel rail, or calculates a discharge amount by closing the solenoid valve based on the fuel pressure of the fuel rail.

11 Claims, 12 Drawing Sheets

(56) References Cited

U.S. PATENT DOCUMENTS

| | | | | |
|---|---|---|---|---|
| 10,982,638 | B2 | 4/2021 | Watanabe et al. | |
| 2008/0029066 | A1* | 2/2008 | Futonagane | F02M 45/12 123/456 |
| 2008/0127943 | A1* | 6/2008 | Kaneko | F02M 63/0225 123/456 |
| 2020/0318592 | A1* | 10/2020 | Watanabe | H01F 7/1844 |

OTHER PUBLICATIONS

Japanese-language Written Opinion (PCT/ISA/237) issued in PCT Application No. PTC/JP2021/004256 dated Jun. 1, 2021 (four (4) pages).

* cited by examiner

SOLENOID VALVE CONTROL DEVICE

TECHNICAL FIELD

The present invention relates to a solenoid valve control device.

BACKGROUND ART

An internal combustion engine of an automobile is required to have high efficiency, low exhaust, and a high output. As means for solving the requirements in a well-balanced manner, an in-cylinder direct injection internal combustion engine has been widely used. An in-cylinder direct injection internal combustion engine is an internal combustion engine that injects fuel pressurized by a high-pressure fuel pump directly into a cylinder from a fuel injection valve. In recent years, regulations on exhaust performance of internal combustion engines have been strengthened on a global scale. As a countermeasure against this, various techniques capable of improving homogeneity, reducing unburned fuel, and the like have been devised and put into practical use in the in-cylinder direct injection internal combustion engine.

As a technique for improving homogeneity, for example, there is a technique of increasing the pressure of fuel injected into a cylinder to promote atomization of the fuel. In the high-pressure fuel pump, in order to increase the pressure of the fuel, a return spring corresponding to a fluid force of the fuel having increased pressure is required. However, when the return spring is strengthened, the responsiveness in operation is deteriorated, and thus, it is necessary to improve an additional mechanism and a component in order to satisfy the increase in fuel pressure and the responsiveness. When the high-pressure fuel pump has a complicated configuration, there is a concern that noise caused by driving increases or the number of times of generation of noise increases.

For example, PTL 1 discloses silent control of a conventional pump. PTL 1 discloses a control device of a high-pressure pump including: motion detection means for detecting a motion of a valve body in response to a drive command when the valve body is displaced to a target position by energizing an electromagnetic portion in accordance with the drive command of a control valve; and energization control means for, when the motion detection means detects that the valve body has been displaced to the target position during the previous energization, performing power reduction control to reduce, by a predetermined amount, supply of power to be supplied to the electromagnetic portion at the time of energization after the previous energization.

In addition, the motion detection means in the control device of the high-pressure pump disclosed in PTL 1 detects the motion of the valve body in response to the drive command by detecting at least one of a change in current flowing through the electromagnetic portion, a change in voltage applied to the electromagnetic portion, a displacement amount of the valve body, and vibration of the control valve.

CITATION LIST

Patent Literature

PTL 1: JP 2017-075609 A

SUMMARY OF INVENTION

Technical Problem

However, in order to detect the change in the current flowing through the electromagnetic portion and the change in the voltage applied to the electromagnetic portion as in the control device of the high-pressure pump disclosed in PTL 1, it is necessary to add a special circuit such as a low-pass filter circuit or an operational amplifier circuit to the existing control circuit.

In view of the above problems, an object of the present invention is to provide a solenoid valve control device capable of detecting a motion of a valve body in response to a drive command without adding a special circuit.

Solution to Problem

In order to solve the above problems and achieve the object of the present invention, according to the present invention, a solenoid valve control device controls opening and closing of a solenoid valve in an internal combustion engine system including: a fuel pump including a plunger that that increases or decreases a volume of a pressurizing chamber by moving up and down with rotation of a cam shaft, a solenoid valve for sucking fuel into the pressurizing chamber, and a discharge valve for discharging fuel in the pressurizing chamber; and a fuel rail that accumulates fuel discharged by the fuel pump. The solenoid valve control device includes a control unit that determines whether or not closing of the solenoid valve has succeeded based on fuel pressure of the fuel rail, or calculates a discharge amount by closing the solenoid valve based on the fuel pressure of the fuel rail.

Advantageous Effects of Invention

According to the solenoid valve control device having the above configuration, it is possible to detect a motion of a valve body in response to a drive command without adding a special circuit.

Objects, configurations, and advantageous effects other than those described above will be clarified by the descriptions of the following embodiments.

DESCRIPTION OF EMBODIMENTS

1. First Embodiment

Figure 1:
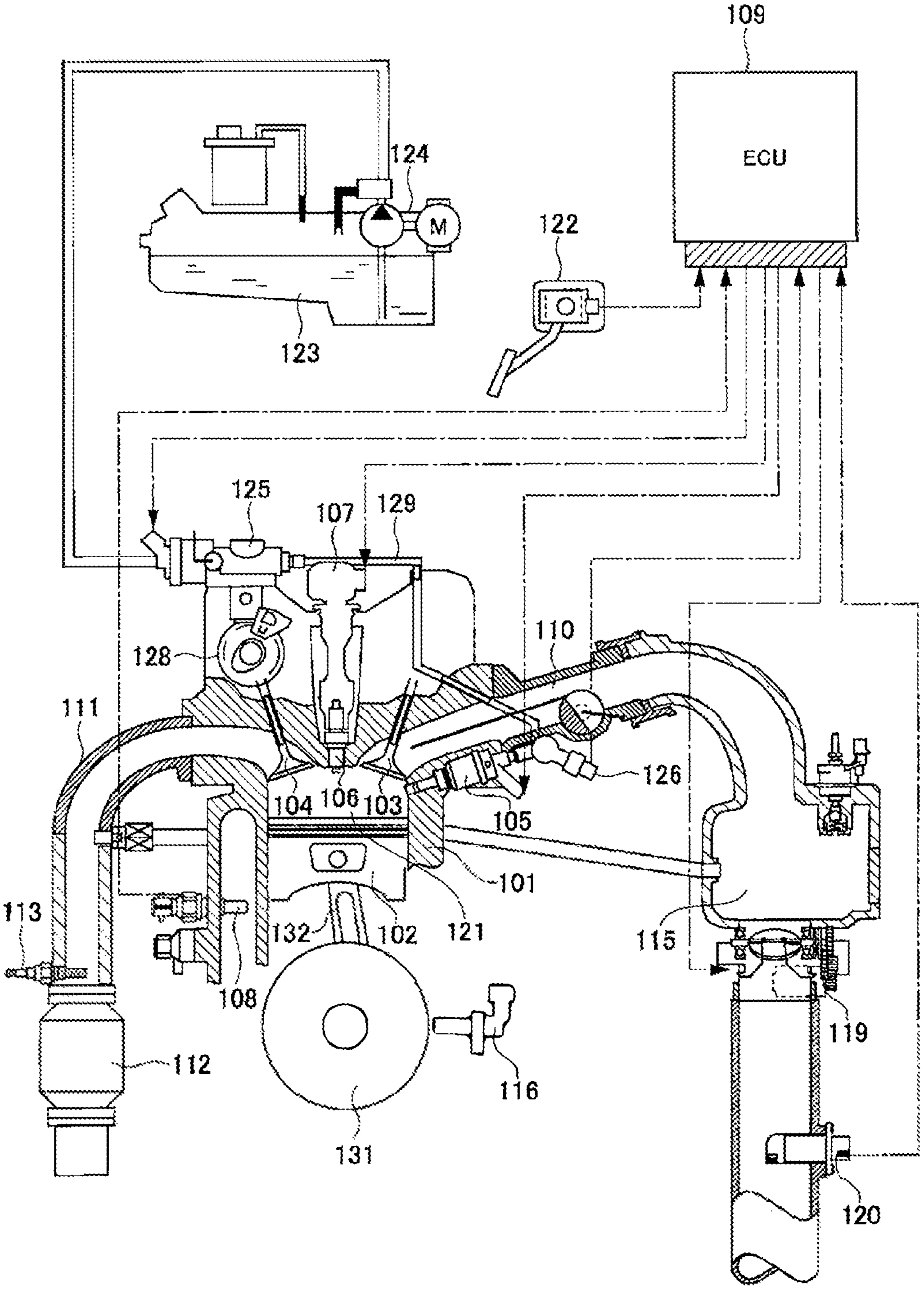
FIG. 1 is an overall configuration diagram illustrating a basic configuration example of an internal combustion engine on which a fuel injection control device is mounted, according to a first embodiment of the present invention.

Hereinafter, a solenoid valve control device according to a first embodiment of the present invention will be described. In the drawings, the common members are denoted by the same reference signs.

[Internal Combustion Engine System]

First, a configuration of an internal combustion engine system equipped with a solenoid valve control device according to the present embodiment will be described. FIG. 1 is an overall configuration diagram of an internal combustion engine system equipped with a fuel injection control device according to an embodiment.

An internal combustion engine (engine) 101 illustrated in FIG. 1 is a four-cycle engine that repeats four strokes of a suction stroke, a compression stroke, a combustion (expansion) stroke, and an exhaust stroke, and is, for example, a multi-cylinder engine including four cylinders. Note that the number of cylinders included in the internal combustion engine 101 is not limited to four, and may include three, six, or eight or more cylinders.

The internal combustion engine 101 includes a piston 102, an intake valve 103, and an exhaust valve 104. The intake air (sucked air) into the internal combustion engine 101 passes through an air flow meter (AFM) 120 that detects the amount of air flowing in, and a flow rate thereof is adjusted by a throttle valve 119. The air that has passed through the throttle valve 119 is sucked into a collector 115 that is a branch portion, and then supplied to a combustion chamber 121 of each cylinder through an intake pipe 110 and an intake valve 103 provided for each cylinder.

On the other hand, the fuel is supplied from a fuel tank 123 to a plurality of high-pressure fuel pumps 125 by a low-pressure fuel pump 124, and is increased to pressure necessary for fuel injection by each high-pressure fuel pump 125. That is, the high-pressure fuel pump 125 moves up and down a plunger (described later with reference to FIG. 3) provided in the high-pressure fuel pump 125 by power transmitted from an exhaust camshaft (not illustrated) of an exhaust cam 128, and pressurizes (boosts) the fuel in the high-pressure fuel pump 125.

An on-off valve (an electromagnetic suction valve 300 to be described later) driven by a solenoid is provided in a suction port of the high-pressure fuel pump 125. The solenoid is connected to an engine control unit (ECU) 109. The ECU 109 includes a solenoid valve control device that controls driving of a solenoid valve. The ECU 109 controls the solenoid to drive the on-off valve so that the pressure (fuel pressure) of the fuel discharged from the high-pressure fuel pump 125 becomes desired pressure.

The fuel boosted by the high-pressure fuel pump 125 is fed to a fuel injection valve 105 via a common rail 129. A plurality of the common rails 129 is provided corresponding to the plurality of high-pressure fuel pumps 125, and each common rail accumulates the fuel discharged by the high-pressure fuel pump 125.

The fuel injection valve 105 is an in-cylinder direct injection type capable of injecting fuel into the combustion chamber 121 a plurality of times in one cycle. The fuel injection valve 105 operates a valve body to inject fuel, for example, by supplying (energizing) a drive current to an electromagnetic coil (solenoid). The fuel injection valve 105 receives a command (injection pulse) from the ECU 109, and injects fuel into the combustion chamber 121 by opening for a time designated by the command.

Note that the total amount of fuel (total fuel injection amount) injected from the fuel injection valve 105 in one cycle can be determined in advance, and each value (injection amount of each time) of the fuel injection amount of the fuel injection performed a plurality of times can also be determined in advance.

In addition, the internal combustion engine 101 is provided with a fuel pressure sensor (fuel pressure sensor) 126 that measures the fuel pressure in the common rail 129. The fuel pressure measured by the fuel pressure sensor 126 is an actual fuel pressure supplied to the fuel injection valve 105, that is, actual fuel pressure. The ECU 109 transmits a control command for setting the fuel pressure in the common rail 129 to desired pressure to the fuel injection valve 105 based on the measurement result of the fuel pressure sensor 126. That is, the ECU 109 performs so-called feedback control to set the fuel pressure in the common rail 129 to the desired pressure.

Furthermore, each combustion chamber 121 of the internal combustion engine 101 is provided with an ignition plug 106, an ignition coil 107, and a water temperature sensor 108. The ignition plug 106 exposes the electrode portion in the combustion chamber 121, and ignites the air-fuel mixture in which the sucked air and the fuel are mixed in the combustion chamber 121 by discharge. The ignition coil 107 creates a high voltage for discharging of the ignition plug 106. The water temperature sensor 108 measures the temperature of cooling water for cooling the cylinder of the internal combustion engine 101.

The ECU 109 performs energization control of the ignition coil 107 and ignition control by the ignition plug 106. The air-fuel mixture in which the sucked air and the fuel are mixed in the combustion chamber 121 is burned by a spark emitted from the ignition plug 106, and the piston 102 is pushed down by this pressure.

An exhaust gas generated by the combustion is discharged to an exhaust pipe 111 through the exhaust valve 104. The exhaust pipe 111 is provided with a three-way catalyst 112 and an oxygen sensor 113. The three-way catalyst 112 purifies harmful substances such as nitrogen oxides (NOx) contained in the exhaust gas. The oxygen sensor 113 detects the oxygen concentration contained in the exhaust gas and outputs the detection result to the ECU 109. The ECU 109 performs feedback control based on the detection result of the oxygen sensor 113 so that the fuel injection amount supplied from the fuel injection valve 105 becomes the target air-fuel ratio.

A crankshaft 131 is connected to the piston 102 via a connecting rod 132. Then, the reciprocating motion of the piston 102 is converted into a rotational motion by the crankshaft 131. A crank angle sensor 116 is attached to the crankshaft 131. The crank angle sensor 116 detects the rotation and the phase of the crankshaft 131 and outputs the detection result to the ECU 109. The ECU 109 can detect the rotational speed of the internal combustion engine 101 based on the output of the crank angle sensor 116.

Signals from the crank angle sensor 116, an air flow meter 120, the oxygen sensor 113, an accelerator opening sensor 122 indicating an opening degree of an accelerator operated by a driver, the fuel pressure sensor 126, and the like are input to the ECU 109.

The ECU 109 calculates a required torque of the internal combustion engine 101 and determines whether or not the engine is in an idle state, based on a signal supplied from the accelerator opening sensor 122. Further, the ECU 109 calculates a sucked air amount necessary for the internal combustion engine 101 from the required torque and the like, and outputs an opening degree signal corresponding thereto to the throttle valve 119.

The ECU 109 calculates the fuel amount and the number of injections corresponding to the sucked air amount of each cylinder (combustion chamber 121) by using outputs of various sensors. Then, the ECU 109 outputs a fuel injection signal corresponding to the calculated fuel amount and the number of injections to the fuel injection valve 105. Further, the ECU 109 outputs an energization signal to the ignition coil 107 and outputs an ignition signal to the ignition plug 106.

The internal combustion engine 101 is mainly required to have low fuel consumption, a high output, and exhaust purification, and is required to reduce noise and vibration as additional values. In the high-pressure fuel pump 125, when the electromagnetic suction valve is opened and closed, the valve body and an anchor collide with the stopper, thereby generating noise.

[Configuration of ECU]

Next, a configuration of the ECU 109 illustrated in FIG. 1 will be described with reference to FIG. 2.

Figure 2:
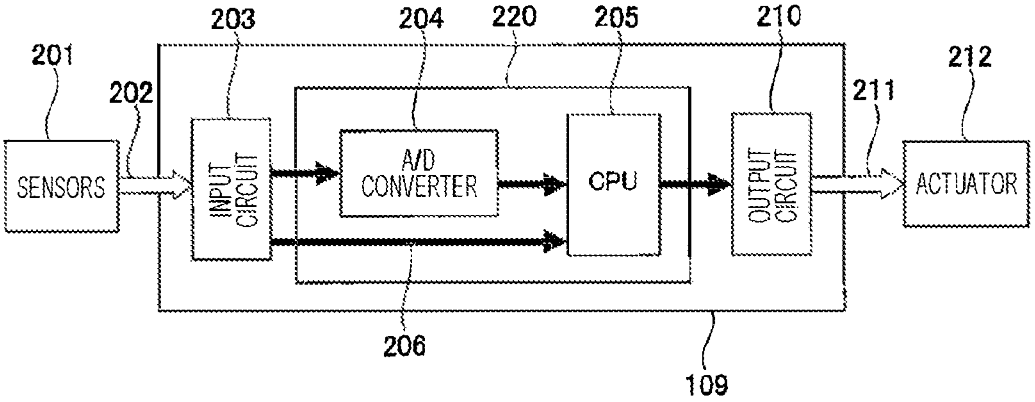
FIG. 2 is a schematic configuration diagram of an ECU according to the first embodiment of the present invention.

FIG. 2 is a schematic configuration diagram of the ECU 109.

The ECU 109 includes an input circuit 203, an A/D converter 204, a central processing unit (CPU) 205 as a central processing unit, and an output circuit 210. The CPU 205 implements a plurality of functions to be described later by executing a program stored in advance.

Note that the ECU may include a field programmable gate array (FPGA) that is a rewritable logic circuit or an application specific integrated circuit (ASIC) that is an application specific integrated circuit.

The input circuit 203 takes in a signal output from sensors 201 (oxygen sensor 113, crank angle sensor 116, air flow meter 120, accelerator opening sensor 122, and the like) as an input signal 202. When the input signal 202 is an analog signal, the input circuit 203 removes a noise component or the like from the input signal 202, and outputs the noise-removed signal to the A/D converter 204.

The A/D converter 204 converts the analog signal into a digital signal and outputs the digital signal to the CPU 205. The CPU 205 takes in the digital signal output from the A/D converter 204 and executes a control logic (program) stored in advance to execute a wide variety of calculations, diagnosis, control, and the like.

The calculation result of the CPU 205 is output as a control signal 211 from the output circuit 210, and drives actuators 212 provided in the intake valve 103, the exhaust valve 104, the fuel injection valve 105, the plurality of high-pressure fuel pumps 125, and the like. On the other hand, in a case where the input signal 202 is a digital signal, the digital signal is directly transmitted from the input circuit 203 to the CPU 205 via a signal line 206, and the CPU 205 executes necessary calculation, diagnosis, control, and the like.

Further, the CPU 205 and the A/D converter 204 constitute a microcomputer (referred to as a "microcomputer" below) 220. The microcomputer 220 is a specific example of a control unit according to the present invention, and performs filter processing, solenoid valve diagnosis processing, and the like to be described later. The filter processing and the solenoid valve diagnosis processing may be performed by hardware resources of the microcomputer 220, or may be performed by using software.

[Configuration of High-Pressure Fuel Pump]

Next, a configuration of a fuel system according to the present embodiment will be described with reference to FIG. 3.

Figure 3:
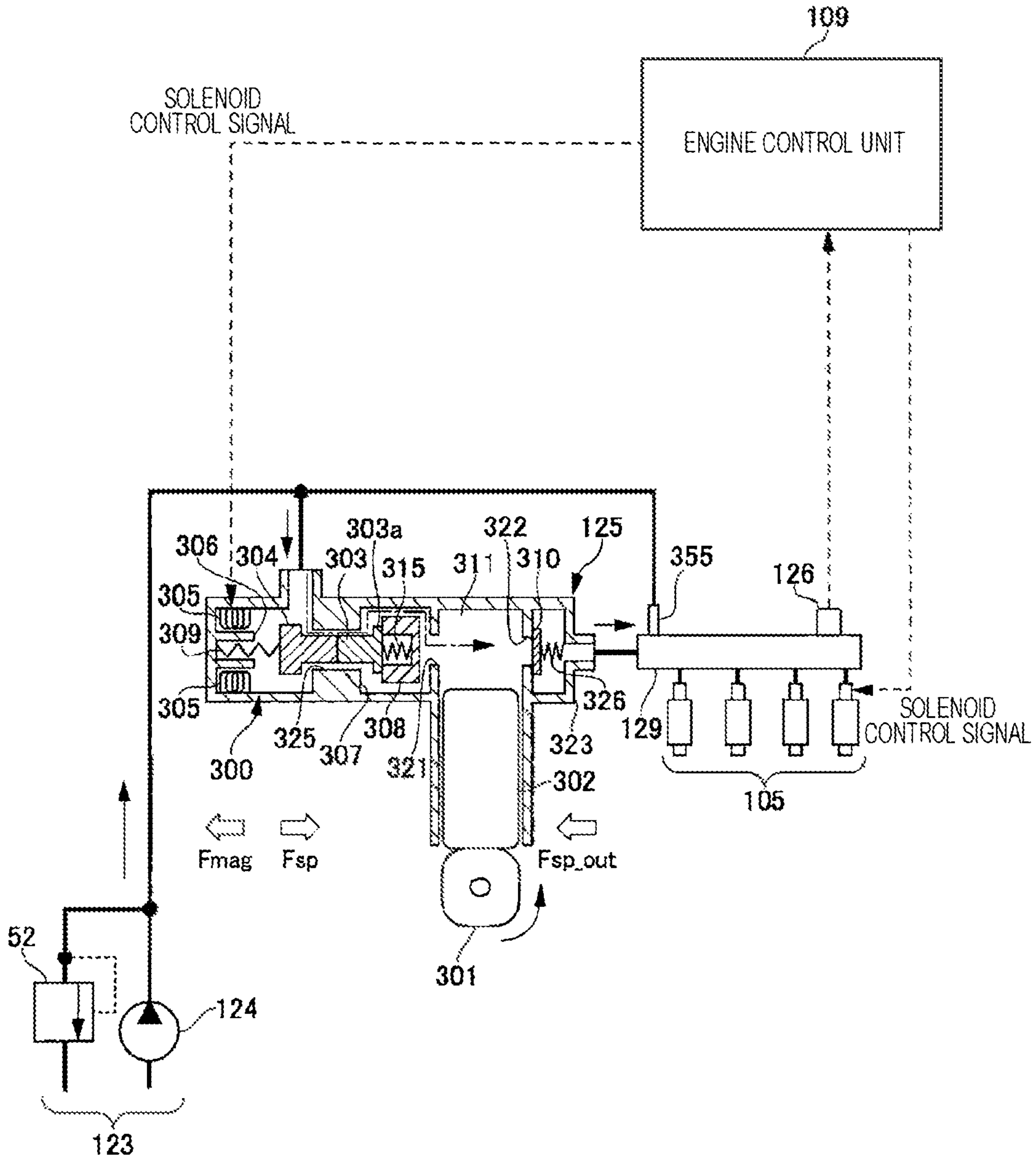
FIG. 3 is an overall configuration diagram of a fuel system according to the first embodiment of the present invention.

FIG. 3 is an overall configuration diagram of the fuel system according to the present embodiment of the present invention.

As illustrated in FIG. 3, the high-pressure fuel pump 125 pressurizes the fuel supplied from the fuel tank 123 and pressure-feeds the fuel to the common rail 129. The fuel is supplied from the fuel tank 123 to the low-pressure fuel pump 124, and is guided from the low-pressure fuel pump 124 to a fuel introduction port of the high-pressure fuel pump 125. At this time, the fuel is regulated to constant pressure by a pressure regulator 152.

The high-pressure fuel pump 125 includes a casing 323. The casing 323 is provided with a communication port 321, an outflow port 322, an inflow port 325, and a pressurizing chamber 311. In addition, the high-pressure fuel pump 125 includes a plunger 302 that moves up and down by rotation of a pump drive cam 301 attached to a camshaft of the internal combustion engine 101, an electromagnetic suction valve 300 that opens and closes in synchronization with the vertical movement of the plunger 302, and a discharge valve 310 that discharges fuel to the common rail 129.

When the plunger 302 descends, the volume of the pressurizing chamber 311 increases. When the plunger 302 rises, the volume of the pressurizing chamber 311 decreases. That is, the plunger 302 is disposed to reciprocate in a direction of increasing and reducing the volume of the pressurizing chamber 311. The discharge valve 310 opens and closes the outflow port 322. A spring portion 326 biases the discharge valve 310 in a valve opening direction. That is, the discharge valve 310 is constantly biased in a direction in which the outflow port 322 is closed. When the pressure of the fuel in the pressurizing chamber 311 becomes larger than a biasing force of the spring portion 326, the outflow port 322 is opened. As a result, the fuel in the pressurizing chamber 311 is discharged to the common rail 129.

The electromagnetic suction valve 300 is a normally open type solenoid valve. A force acts in a valve opening direction during non-energization, and a force acts in a valve closing direction during energization. The electromagnetic suction valve 300 includes a valve body 303, a first spring 309 that biases the valve body 303 in the valve opening direction, a second spring 315 that biases the valve body 303 in the valve closing direction, a solenoid 305, and an anchor 304.

The valve body 303 is formed in a substantially rod shape, and the anchor 304 is provided at one end portion in an axial direction. Further, an abutment piece 303*a* is formed at the other end portion of the valve body 303. The abutment piece 303*a* abuts on a seat portion 307 provided in the inflow port 325 when the valve is closed. Thus, the valve body 303 closes the communicating portion between the inflow port 325 and the pressurizing chamber 311.

One end of the first spring 309 is connected to the anchor 304. The other end of the first spring 309 is connected to the casing 323. One end of the second spring 315 is connected to a stopper 308 disposed between the valve body 303 and the pressurizing chamber 311. The other end of the second spring 315 is connected to an end portion of the valve body 303 on an opposite side of the anchor 304.

The solenoid 305 faces the anchor 304. When a current flows through the solenoid 305, an electromagnetic force is generated between the solenoid 305 and the anchor 304. As a result, the anchor 304 is pulled in the valve closing direction which is a direction against the spring force of the first spring 309 (left side in FIG. 3).

In the high-pressure fuel pump 125, on/off of energization of the solenoid 305 is controlled to control the operation of the anchor 304 in the axial direction (left-right direction in FIG. 3). In a state where the energization of the solenoid 305 is off, the anchor 304 is constantly biased in the valve opening direction (the right direction in FIG. 3) by the first spring 309. Thus, the valve body 303 is held at a valve opening position.

When the energization of the solenoid 305 is turned on, an electromagnetic attractive force is generated between a fixing portion 306 (magnetic core) and the anchor 304. As a result, the anchor 304 is attracted in the valve closing direction (left direction in FIG. 3) against the spring force of the first spring 309. In a state where the anchor 304 is attracted to the fixing portion 306, the valve body 303 acts as a check valve that opens and closes based on the differential pressure between the upstream side and the downstream side and the biasing force of the second spring 315.

When the pressure on the downstream side of the valve body 303 increases, the valve body 303 moves in the valve closing direction. When the valve body 303 moves by a lift amount set in the valve closing direction, the valve body 303 is seated on the seat portion 307. As a result, the electromagnetic suction valve 300 is closed, and it is not possible for the fuel in the pressurizing chamber 311 to flow back to the low-pressure pipe side.

When the plunger 302 descends, and the electromagnetic suction valve 300 is opened, the fuel flows from the inflow port 325 into the pressurizing chamber 311. A stroke in which the plunger 2 descends is referred to as a suction stroke below. On the other hand, when the plunger 302 rises, and the electromagnetic suction valve 300 is closed, the fuel in the pressurizing chamber 311 is boosted, passes through the discharge valve 310 (outflow port 322), and then is pressure-fed to the common rail 129. A stroke in which the plunger 302 rises is referred to as a compression stroke below.

If the electromagnetic suction valve 300 is closed during the compression stroke, the fuel sucked into the pressurizing chamber 311 during the suction stroke is pressurized and discharged to the common rail 129 side. On the other hand, if the electromagnetic suction valve 300 is opened during the compression stroke, the fuel in the pressurizing chamber 311 is pushed back toward the inflow port 325 and is not discharged toward the common rail 129. As described above, the fuel discharge by the high-pressure fuel pump 125 is operated by opening and closing the electromagnetic suction valve 300. The opening and closing of the electromagnetic suction valve 300 are controlled by the ECU 109 (solenoid valve control device).

The common rail 129 accumulates the fuel discharged from the high-pressure fuel pump 125. A plurality of fuel injection valves 105, a fuel pressure sensor 126, and a pressure adjustment valve (referred to as a "relief valve" below) 355 are mounted to the common rail 129. When the fuel pressure in the common rail 129 exceeds a predetermined value, the relief valve 355 is opened and prevents breakage of the pipe. The plurality of fuel injection valves 105 are mounted in accordance with the number of cylinders (combustion chambers 121), and inject fuel in accordance with the drive current output from the ECU 109.

The fuel pressure sensor 126 outputs the detected pressure data to the ECU 109. The ECU 109 calculates an appropriate injection fuel amount (target injection fuel length), appropriate fuel pressure (target fuel pressure), and the like based on engine state quantities (for example, a crank rotation angle, a throttle opening degree, an engine rotational speed, and fuel pressure) obtained from various sensors.

In addition, the ECU 109 controls driving of the high-pressure fuel pump 125 and the plurality of fuel injection valves 105 based on the calculation result. That is, the ECU 109 (solenoid valve control device) includes a pump control unit that controls the high-pressure fuel pump 125 and an injection valve control unit that controls the fuel injection valve 105.

[Operation of High-pressure Fuel Pump]

Next, an operation of the high-pressure fuel pump according to the present embodiment will be described with reference to FIG. 4.

Figure 4:
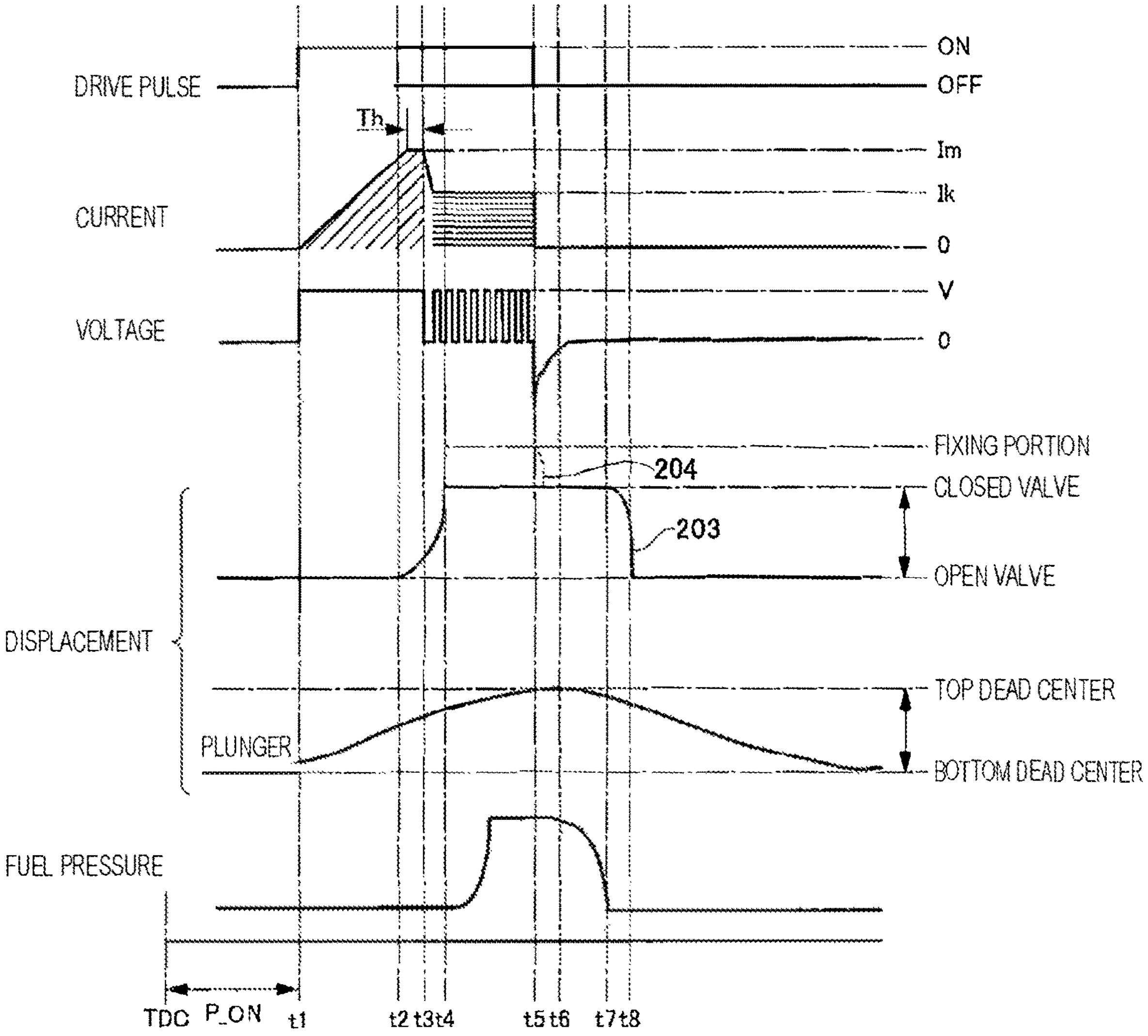
FIG. 4 is a diagram illustrating a time chart of an operation of a high-pressure fuel pump according to the first embodiment of the present invention.

FIG. 4 is a time chart for explaining the operation of the high-pressure fuel pump 125.

The electromagnetic suction valve 300 opens and closes in synchronization with the rising and descending of the plunger 302. The ECU 109 (solenoid valve control device) detects the rotation angle of the pump drive cam 301, and starts applying of a voltage V to both ends of the solenoid 305 after the pump drive cam 301 rotates from the top dead center (TDC) to a predetermined angle (P_ON timing), for example (timing t1).

A current I flowing through the solenoid 305 increases in accordance with Expression 1. Note that L indicates the inductance of the solenoid 305 and the wiring, and R indicates the resistance of the solenoid 305 and the wiring.

$$L\,dI/dt=V-RI \qquad \text{(Expression 1)}$$

As the current I increases, the magnetic attraction force Fmag by which the fixing portion 306 (magnetic core) attracts the anchor 304 increases. When the magnetic attraction force Fmag becomes larger than the spring force Fsp of the first spring 309, the anchor 304 pressed by the spring force Fsp starts moving toward the fixing portion 306 (timing t2).

When the anchor 304 moves toward the fixing portion 306, the valve body 303 pressed by the fuel pressurized by the rising of the plunger 302 moves to the fixing portion 306 with following the anchor 304. Then, the abutment piece 303*a* of the valve body 303 collides with the seat portion 307. That is, the valve body 303 is seated on the seat portion 307. As a result, the flow path of the fuel (dotted line in FIG. 3) is closed, and the fuel pressurized by the rising of the plunger 302 cannot return to the low pressure pipe side. As a result, the fuel pressure in the pressurizing chamber 311 increases. (Timing t4).

When the fuel pressure of the pressurizing chamber 311 becomes larger than the spring force Fsp out for biasing the discharge valve 310, the discharge valve 310 is opened. As a result, the fuel pressurized by the rising of the plunger 302 is discharged to the common rail 129. Then, when the drive pulse is turned off at a timing t5, a reverse voltage is applied to the solenoid 305. Thus, a holding current supplied to the solenoid 305 is cut off.

When the cam angle exceeds the top dead center and the plunger 302 starts to descend (timing t6), the fuel pressure in the pressurizing chamber 311 decreases. When the fuel pressure of the pressurizing chamber 311 becomes smaller than the spring force Fsp out, the discharge valve 310 is closed. As a result, the discharge of the fuel by the high-pressure fuel pump 125 is ended. Since the fuel pressure in the pressurizing chamber 311 decreases, the anchor 304 moves from a valve closing position to a valve opening position together with the valve body 303 (timings t7 to t8).

With such an operation, the high-pressure fuel pump 125 feeds the fuel from a low-pressure pipe to the common rail 129. In this process, noise is generated when the anchor 304 collides with the fixing portion 306 to complete the valve closing (timing t4 in FIG. 4) and when the anchor 304 and the valve body 303 collide with the stopper 308 to complete the valve opening (timing t8 in FIG. 4). The noise may make the driver uncomfortable, particularly at an idle time. In the present embodiment, noise at the time of completing the valve closing is reduced.

[Peak Current and Holding Current]

Next, the peak current and the holding current according to the present embodiment will be described with reference to FIG. 4.

The current for driving the high-pressure fuel pump 125 is roughly divided into two pieces. That is, the drive current of the high-pressure fuel pump 125 is divided into a peak current (hatched portion of a current waveform in FIG. 4) and a holding current (horizontal line portion of the current waveform in FIG. 4). As illustrated in FIG. 4, the maximum current value of the peak current is set as Im, and the maximum current value of the holding current is set as Ik.

When the peak current flows, a force for closing the valve is applied to the valve body 303 and the anchor 304 which are biased by the first spring 309 and are stopped at the valve opening position. On the other hand, when the holding current flows, the anchor 304 approaching the fixing portion 306 is attracted until colliding with the fixing portion 306. Further, after the anchor 304 collides with the fixing portion 306, the contact state is maintained.

When the application amount of the peak current is reduced, the biasing of closing the valve is weakened. Thus, it is possible to reduce noise. However, when the application amount of the peak current is excessively reduced, the closing of the electromagnetic suction valve 300 fails. Therefore, it is desired to reduce the application amount of the peak current as much as possible within a range in which the electromagnetic suction valve 300 is closed.

Figure 5:
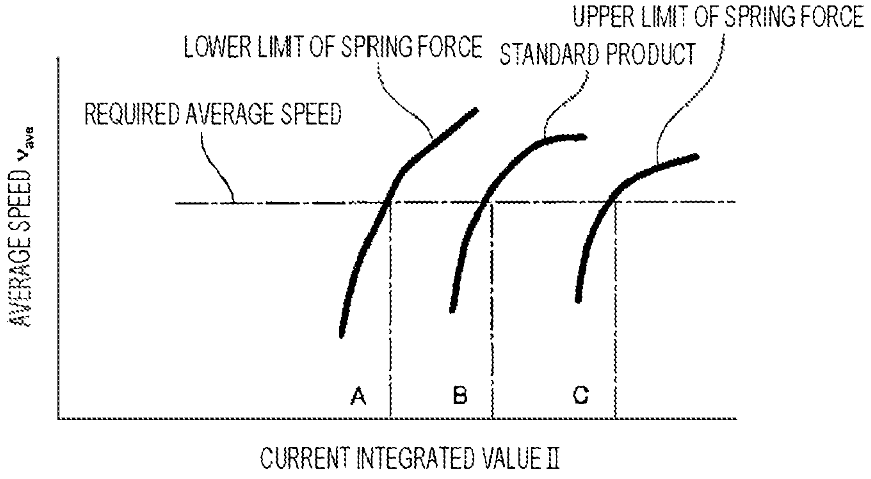
FIG. 5 is a diagram illustrating variations in individual characteristics of the high-pressure fuel pump.

Basically, the application amount of the peak current at the limit (minimum) at which the electromagnetic suction valve is closed depends on the individual characteristics of the high-pressure fuel pump. FIG. 5 is a diagram illustrating variations in individual characteristics of the high-pressure fuel pump. FIG. 5 illustrates a relationship between an average speed v_ave during valve closing (average value from valve closing start to valve closing completion) and a peak current integrated value II for a case of the standard spring force Fsp, a case where the spring force Fsp has an upper limit due to manufacturing variations, and a case where the spring force Fsp has a lower limit due to manufacturing variations.

Note that, in the present embodiment, the application amount of the peak current is set to the integrated value of the current, but similar individual characteristics are established even though the application amount of the peak current is replaced with the integrated value of the square of the current or the integrated value of the product of the current and the voltage.

From FIG. 5, it is found that the relationship between the peak current integrated value II and the average speed v_ave varies depending on the spring force Fsp. That is, when the average speed required in a certain solenoid valve is indicated by a broken line, the required peak current integrated value II greatly varies in the range of A to C due to individual differences.

When a valve closing limit current with respect to the lower limit product of the spring force Fsp is set to the upper limit product of the spring force Fsp, the magnetic attraction force generated by the solenoid becomes smaller than the spring force, and the closing of the electromagnetic suction valve fails. Therefore, as the valve closing limit current, it is necessary to select the valve closing limit current with respect to the upper limit product of the spring force Fsp. However, when the lower limit product of the spring force Fsp is controlled by the valve closing limit current with respect to the upper limit product of the spring force Fsp, an excessive magnetic attraction force is generated as compared with the spring force. As a result, the electromagnetic suction valve is closed at a speed more than necessary.

Figure 6:
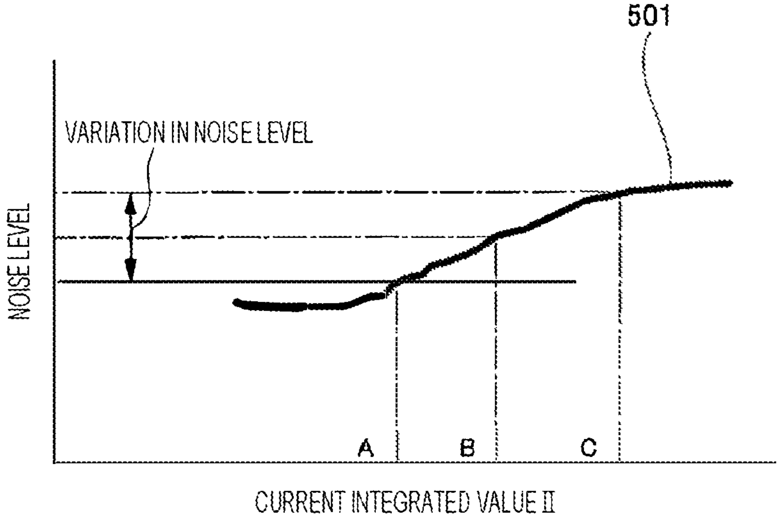
FIG. 6 is a diagram illustrating a relationship between a drive current value and a noise level of the high-pressure fuel pump.

FIG. 6 is a diagram illustrating the relationship between the drive current value and the noise level of the high-pressure fuel pump. As illustrated in FIG. 6, the noise level increases as the peak current integrated value II increases. In addition, as described with reference to FIG. 5, it is necessary to set the value of the valve closing limit current to the value (current value C) corresponding to the upper limit product of the spring force Fsp. However, the current value required for the lower limit product of the spring force Fsp is the current value A. Therefore, the width of the double-headed arrow illustrated in FIG. 5 varies in the noise level. That is, if the current value applied to the lower limit product of the spring force Fsp can be reduced to the current value A, which is an originally necessary value, it is possible to reduce the noise level corresponding to the variation.

[Valve Closing Detection Using Fuel Rail Pressure]

In order to apply the current value corresponding to the spring force Fsp, in other words, an appropriate current value corresponding to the pump individual difference to the solenoid valve, it is necessary to detect the pump individual difference. In the present embodiment, fuel rail pressure (fuel pressure in the common rail 129) is used as means for detecting an individual difference.

The high-pressure fuel pump 125 and the fuel injection valve 105 are connected to the common rail 129 having a pressure accumulation function. The action of each solenoid valve in the high-pressure fuel pump 125 and the fuel injection valve 105 has a close relationship with the fuel pressure in the common rail 129. For example, when the electromagnetic suction valve 300 of the high-pressure fuel pump 125 is closed, the fuel pressure in the pressurizing chamber 311 increases. As a result, the fuel in the pressurizing chamber 311 is discharged from the discharge valve 310, and the fuel pressure in the common rail 129 increases.

That is, it can be said that the valve closing success of the electromagnetic suction valve 300 is an increase in the fuel pressure in the common rail 129.

On the other hand, when the solenoid valve of the fuel injection valve 105 is closed, the fuel is injected from the injection port of the fuel injection valve 105, so that the fuel pressure in the common rail 129 decreases. That is, it can be said that the valve closing success of the solenoid valve in the fuel injection valve 105 is a decrease in the fuel pressure in the common rail 129.

Figure 7:
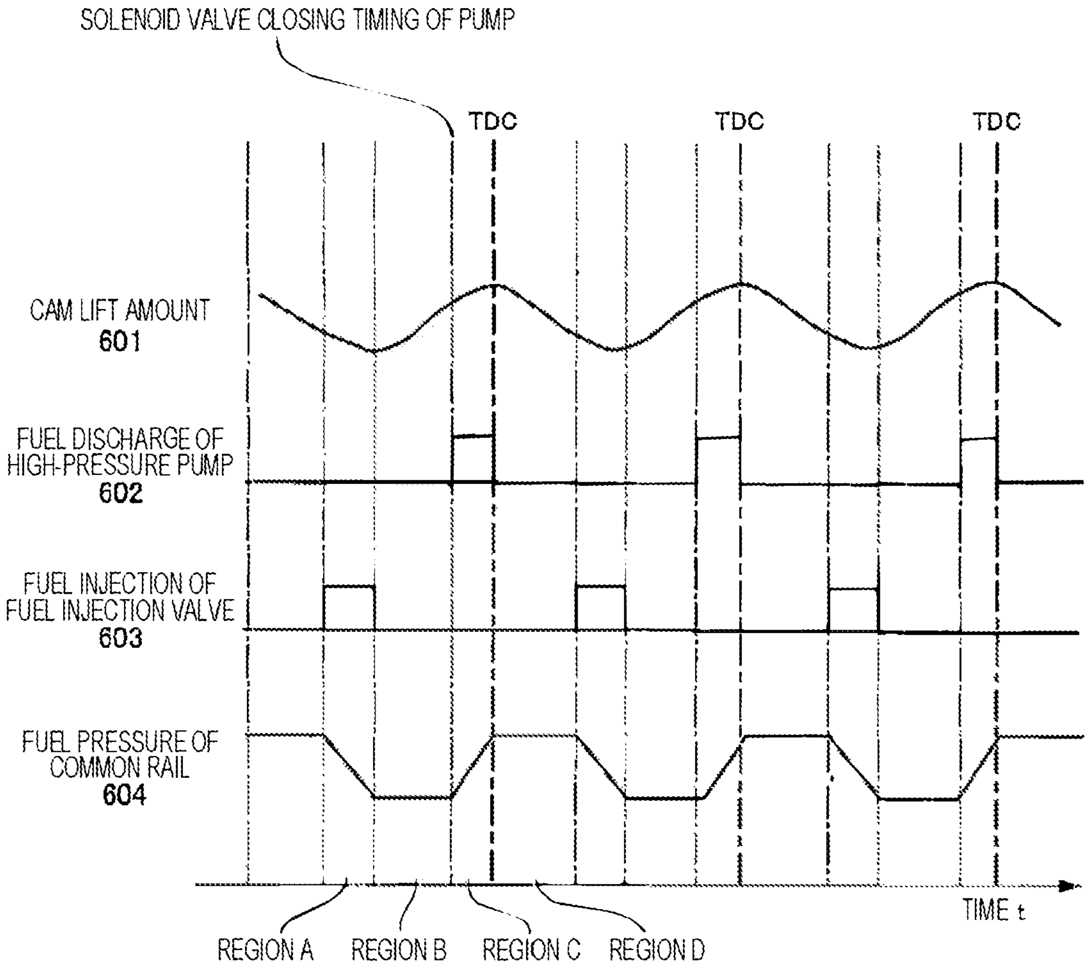
FIG. 7 is a diagram illustrating a relationship among fuel discharge of a high-pressure fuel pump pump, fuel injection of a fuel injection valve, and fuel pressure of a common rail.

FIG. 7 is a diagram illustrating a relationship among fuel discharge of the high-pressure fuel pump, fuel injection of the fuel injection valve, and fuel pressure of the common rail. In the high-pressure fuel pump 125, fuel is discharged through the discharge valve 310 (fuel discharge 602 of the high-pressure pump) in accordance with the decrease in the volume of the pressurizing chamber 311 due to the rising of the plunger 302 (increase in the cam lift amount 601) during a period from the completion of the valve closing of the electromagnetic suction valve 300 to the TDC.

Further, the fuel injection valve 105 injects fuel based on an injection instruction from the ECU 109 (fuel injection 603 of the fuel injection valve). As a result, the fuel pressure 604 in the common rail 129 generally transitions through four regions A, B, C, and D.

The region A is an influence region of the fuel injection valve 105, and the fuel pressure 604 in the common rail 129 decreases in accordance with the fuel injection amount by the fuel injection valve 105. The region B next to the region A is a region in which the fuel pressure 604 in the common rail 129 is held. In the region B, the discharge of fuel by the high-pressure fuel pump 125 and the injection of fuel by the fuel injection valve 105 are not performed. Therefore, the fuel pressure 604 in the common rail 129 is maintained at a value decreased in the region A.

The region C next to the region B is an influence region of the high-pressure fuel pump 125, and the fuel pressure 604 in the common rail 129 increases in accordance with the fuel discharge amount by the high-pressure fuel pump 125. The region D next to the region C is a region in which the fuel pressure in the common rail 129 is held. Also in this region, similarly to the region B, fuel discharge by the high-pressure fuel pump 125 and fuel injection by the fuel injection valve 105 are not performed. Therefore, the fuel pressure 604 in the common rail 129 is maintained at a value increased in the region C. Basically, the injection amount by the fuel injection valve 105 and the discharge amount of the high-pressure fuel pump 125 are balanced to achieve the target fuel pressure of the system as the average fuel pressure.

From the relationship among the pump discharge, the fuel injection valve injection, and the rail fuel pressure as described above, it is found that it is possible to grasp the valve action of the electromagnetic suction valve 300 of the high-pressure fuel pump 125 and the fuel injection valve 105 by detecting the fuel pressure in the common rail 129. Specifically, by detecting the fuel pressure in the common rail 129, it is possible to detect whether the electromagnetic suction valve 300 and the fuel injection valve 105 are closed. In addition, it is possible to easily detect the fuel pressure in the common rail 129 from the value of the fuel pressure sensor mounted in a general direct injection system.

As described above, the monitored value required in the present invention is only the value of the fuel pressure in the common rail 129 that can be read from the known fuel pressure sensor 126. Therefore, in the present invention, it is not necessary to newly develop a circuit and a control, and it is possible to implement a shorter delivery time and lower cost than in the case of newly developing a circuit and a control in the related art. On the other hand, conventionally, the current/voltage value is directly detected in order to detect whether the solenoid valve is closed. As a result, the cost and the lead time increase.

[Control of Electromagnetic Suction Valve]

Figure 8:
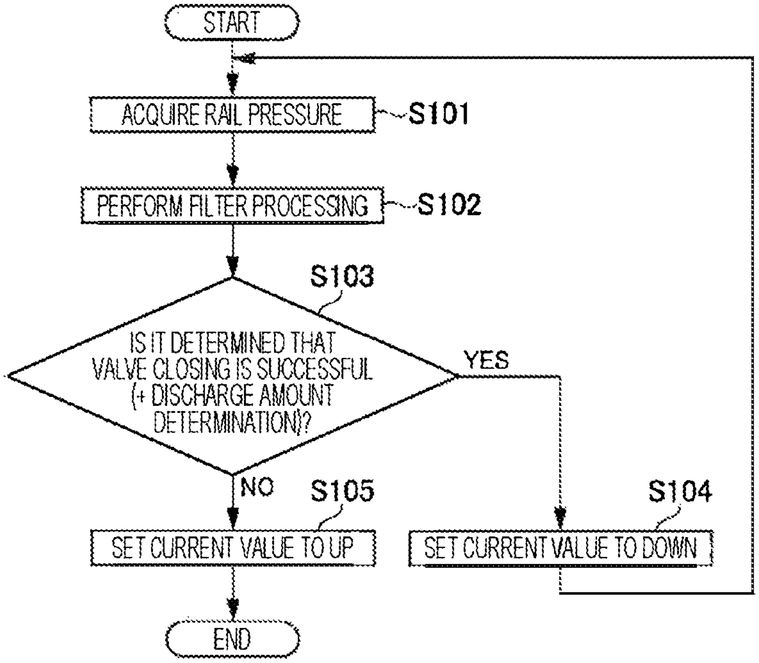
FIG. 8 is a flowchart of solenoid valve control in the high-pressure fuel pump according to the first embodiment of the present invention.

Next, control processing of the electromagnetic suction valve 300 will be described with reference to FIG. 8. FIG. 8 is a flowchart of solenoid valve control in the high-pressure fuel pump according to the first embodiment of the present invention.

First, the ECU 109 (solenoid valve control device) acquires fuel pressure data in the common rail 129 (S101). In this processing, fuel pressure data is acquired from the fuel pressure sensor 126. Note that the sampling period is desirably fine. However, even with a resolution of a level set in the related art, such as 1 ms, 2 ms, or 4 ms, it is possible to ensure sufficient accuracy for the present control as long as the resolution is in a low rotation to middle rotation range where noise becomes a problem in an engine in general.

Figure 9:
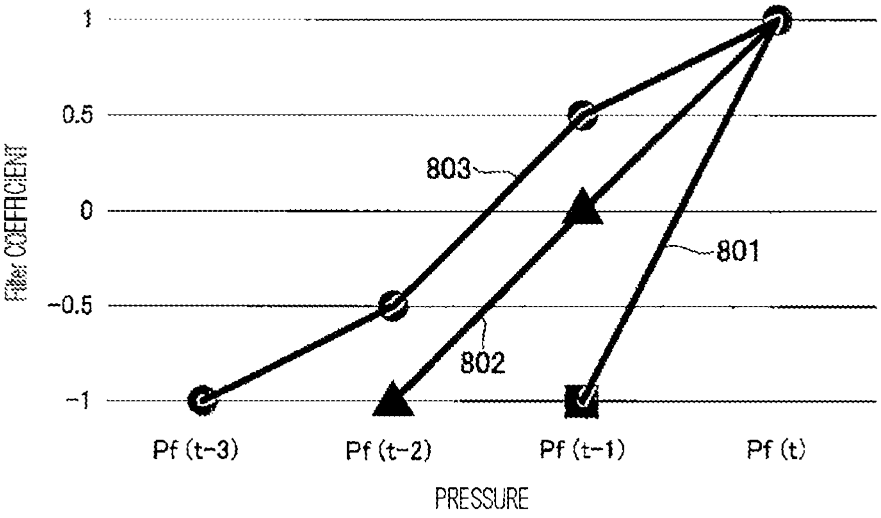
FIG. 9 is a diagram illustrating a filter example used for fuel pressure data according to the first embodiment of the present invention.

Next, the ECU 109 (solenoid valve control device) applies filter processing corresponding to the application, on the acquired fuel pressure data (S102). FIG. 9 is a diagram illustrating a filter example used for fuel pressure data. Filter 1 is calculated by using Filter coefficient 801. Filter 2 is calculated by using Filter coefficient 802. Filter 3 is calculated by using Filter coefficient 803. That is, Filter 1, Filter 2, and Filter 3 are calculated by the following Expressions (2) to (4), respectively.

$$\text{Filter 1}=(1\times Pf(t))+(-1\times Pf(t-1)) \quad \text{(Expression 2)}$$

$$\text{Filter 2}=(1\times Pf(t))+(0\times Pf(t-1))+(-1\times Pf(t-2)) \quad \text{(Expression 3)}$$

$$\text{Filter 3}=(1\times Pf(t))+(0.5\times Pf(t-1))+(-0.5\times Pf(t-2))+(-1\times Pf(t-3)) \quad \text{(Expression 4)}$$

Filters 1 to 3 are filters that extract the difference by cutting the DC component. For Filter 1, a sampling period is the peak of the gain of change. For Filter 2, twice the sampling period is the peak of the gain of change. For Filter 3, three times the sampling period is the peak of the gain of change. Therefore, it is preferable to set the filter at a well-balanced point from the viewpoint of detectability with the sampling frequency and noise removal.

Then, the ECU 109 (solenoid valve control device) determines whether or not closing of the electromagnetic suction valve 300 succeeds by comparing pressure data (fuel pressure 901) after the filter processing with a threshold value 902 set in advance (S103). The process of S103 corresponds to solenoid valve diagnosis processing according to the present invention. In this processing, when the fuel pressure data after the filter process exceeds the threshold value, it is determined that the valve is successfully closed. When the fuel pressure data after the filter process is equal to or smaller than the threshold value, it is determined that the valve closing has failed.

Figure 10:
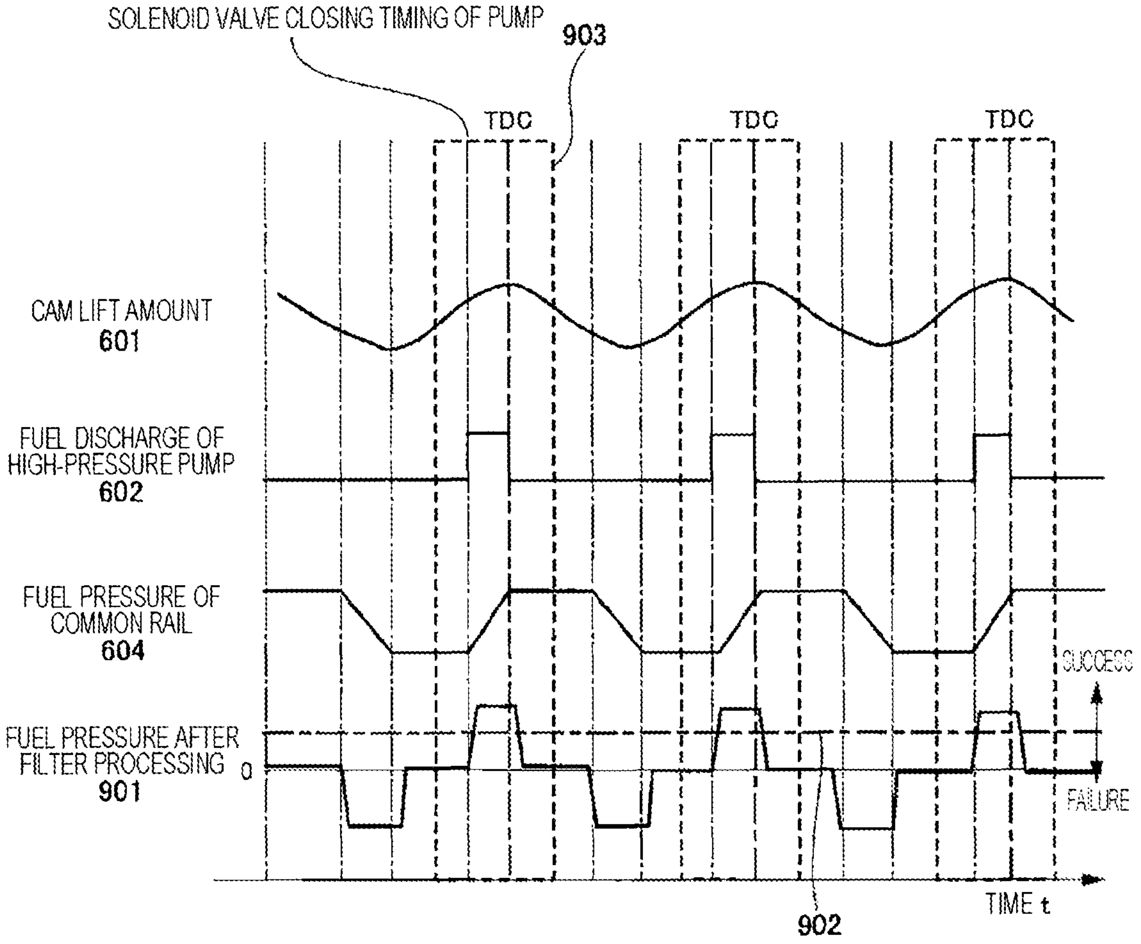
FIG. 10 is a diagram illustrating a relationship among the fuel discharge of the high-pressure fuel pump, the fuel injection of the fuel injection valve, the fuel pressure of the common rail, and fuel pressure after filter processing according to the first embodiment of the present invention.

FIG. 10 is a diagram illustrating the relationship among the fuel discharge of the high-pressure fuel pump, the fuel injection of the fuel injection valve, the fuel pressure of the common rail, and fuel pressure after filter processing according to the first embodiment of the present invention. As illustrated in FIG. 10, when the fuel pressure 901 after the filter processing exceeds a threshold value 902, it is considered that the fuel discharge amount has reached the target discharge amount. Therefore, it can be determined that the fuel in the pressurizing chamber 311 in the high-pressure fuel pump 125 has not returned to the inflow port 325 (see FIG. 3) and the valve has been successfully closed.

On the other hand, when the fuel pressure 901 after the filter processing is equal to or smaller than the threshold value 902, it is considered that the fuel discharge amount does not reach the target discharge amount. Therefore, it can be determined that the fuel in the pressurizing chamber 311 in the high-pressure fuel pump 125 has returned to the inflow port 325 (see FIG. 3) and the valve closing has failed.

A value preventing erroneous detection in consideration of noise, detection accuracy, and the like is considered as the lower limit side of the threshold value 902. In addition, a value allowing reliable detection even at the gain lower limit when the pump performs discharge with including variations is considered as the upper limit side of the threshold value 902. The threshold value 902 is set between the lower limit side and the upper limit side. If only the closing of the electromagnetic suction valve 300 is detected, considering the lower limit side is not a program as described above.

However, in a scene where the accuracy of the discharge amount is required, the electromagnetic suction valve 300 is closed, but the responsiveness is delayed, so that the accuracy of the discharge flow rate may be a problem. Therefore, when the lower limit side of the threshold value is set, it is necessary to take into consideration a factor of a minimum required discharge flow rate in addition to preventing erroneous detection in consideration of noise, detection accuracy, and the like. In addition, the threshold value 902 may be a fixed value, but, in a case where there is not one control scene, it is necessary to set the threshold value by MAP in accordance with the fuel pressure, the discharge amount of the pump, and the like, or to set the threshold value variably.

The conversion from the discharge flow rate to the pressure fluctuation can be calculated from the pressure, the volume, the fuel physical properties, and the like by using an expression of the compressible fluid. Conversely, the discharge flow rate of the high-pressure fuel pump can be calculated from the change amount of the measurement signal (pressure data after difference filtering processing). In the processing of S103, the discharge flow rate of the high-pressure fuel pump may be calculated, and it may be determined whether the current setting value is corrected to a low value or a high value from the calculated discharge flow rate. For example, when the calculated discharge flow rate of the high-pressure fuel pump is greater than a predetermined value, the same determination (YES determination) as the case where the valve is successfully closed is made. On the other hand, when the calculated discharge flow rate of the high-pressure fuel pump is equal to or smaller than the predetermined value, the same determination (NO determination) as the case where the valve closing has failed is made.

In addition, as illustrated in FIG. 10, a determination window 903 is set every 1 cam cycle so that the range in which the fuel is actually discharged within the range from the bottom dead center to the top dead center of the plunger 302 from which the high-pressure fuel pump 125 can discharge the fuel can be reliably covered. Note that it is possible to reduce the risk of erroneous detection due to noise or the like by limiting the determination window 903 to a necessary range.

When it is determined in S103 that the valve is successfully closed (YES determination in S103), the ECU 109 (solenoid valve control device) determines that the current current setting value has a margin. Then, the ECU 109 (solenoid valve control device) corrects the current setting value to a value lower than a setting value at the current time (S104). Then, the ECU 109 (solenoid valve control device) acquires fuel pressure data again. That is, the ECU 109 (solenoid valve control device) returns the process to S101.

The smaller the correction amount (feedback amount) of the current setting value in S104, the higher the accuracy. However, the finer the correction amount of the current setting value, the more susceptible to noise, and the more time is required for determination. Therefore, the correction amount (feedback amount) of the current setting value in S104 may be set in consideration of both the time allocated to the main control and the required accuracy.

On the other hand, when it is determined in S103 that the valve closing has failed (NO in S103), the ECU 109 (solenoid valve control device) determines that the current current setting value is low. Then, the ECU 109 (solenoid valve control device) corrects the current setting value to a value higher than the setting value at the current time (S105). Then, the ECU 109 (solenoid valve control device) determines that the current setting value corrected in the processing of S105 is the minimum current value, and then ends the control.

The correction amount (feedback amount) of the current setting value in S105 may be set to be the current setting value for which the valve closing success has been achieved last. However, it is desirable to set the correction amount (feedback amount) of the current setting value in S105 in consideration of an appropriate safety factor based on robustness. In addition, the correction amount (feedback amount) of the current setting value in S104 and S105 may be stored in the storage unit as a map value or may be variably set in accordance with the operation scene.

In the above-described control of the solenoid valve, filter processing is performed on the pressure fluctuation every shot (every energization pulse of the solenoid valve) to determine whether closing of the solenoid valve succeeds. Therefore, it is possible to more accurately and directly detect the valve closing success/failure of the solenoid valve as compared with a method of determining the valve closing success/failure of the solenoid valve simply based on whether the fuel pressure decreases or increases.

In addition, by feeding back the valve closing success/failure of the solenoid valve to the drive current value, it is possible to drive the solenoid valve at the minimum current value, and it is possible to realize significant noise reduction and power saving. Furthermore, since only the fuel rail fuel pressure value (fuel pressure data in the common rail 129), which is an existing monitored value, is used to detect the valve closing of the solenoid valve, it is possible to detect the valve closing of the solenoid valve without a need to add a new control circuit. As a result, it is possible to significantly shorten the development period and to significantly reduce the cost.

2. Second Embodiment

Next, a solenoid valve control device according to a second embodiment of the present invention will be described. The solenoid valve control device according to the second embodiment of the present invention has the same configuration as the solenoid valve control device according to the first embodiment described above. The solenoid valve control device according to the second embodiment is different from the solenoid valve control device according to the first embodiment in control of the electromagnetic suction valve. Therefore, here, the control of the electromagnetic suction valve according to the second embodiment will be described, and the description of the common configuration of the ECU (solenoid valve control device), the high-pressure fuel pump, the electromagnetic suction valve, and the like will be omitted.

[Control of Electromagnetic Suction Valve]

Control processing of an electromagnetic suction valve 300 according to the second embodiment will be described with reference to FIG. 11.

Figure 11:
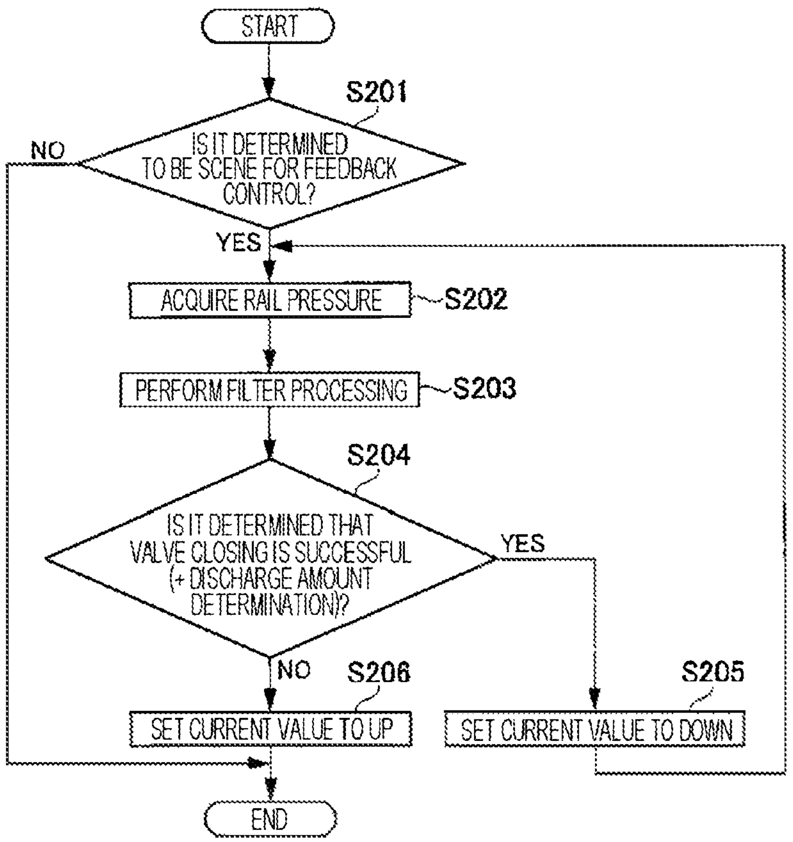
FIG. 11 is a flowchart of solenoid valve control in a high-pressure fuel pump according to a second embodiment of the present invention.

FIG. 11 is a flowchart of solenoid valve control according to the second embodiment.

First, the ECU 109 (solenoid valve control device) performs scene determination (S201). In this processing, whether or not to continue the main feedback control (processing of feeding whether or not closing of the electromagnetic suction valve succeeds back to the drive current value) is determined from the operation scene. The main feedback control is difficult to perform in all driving scenes. For example, during the transient operation, the required fuel pressure and the required discharge amount change from moment to moment, and the disturbance increases. Therefore, there is a possibility that appropriate feedback is not performed during the transient operation, and thus it is desirable not to perform the main feedback control.

Specifically, examples of the scene where the main feedback control is performed include time of an engine shipping test, time of maintenance, time of a no-load operation, and time of a normal operation. When the main feedback control is performed at the time of the engine shipping test, it is possible to initially reduce noise of the solenoid valve initially (before reaching the user). When the main feedback control is performed at the time of the maintenance, it is possible to adjust the current value again assuming that the required current value has changed due to durability deterioration of the pump or the like. When the main feedback control is performed during the no-load operation (idle operation) or the normal operation, it is possible to reduce noise during the idle operation. In addition, the current value can be fed back online.

When it is determined in S201 that the scene is not a scene where the main feedback control is performed (NO in S201), the ECU 109 (solenoid valve control device) ends the control. Thus, the main feedback control is not performed. On the other hand, when it is determined in S201 that the scene is the scene where the main feedback control is performed (YES determination in S201), the ECU 109 (solenoid valve control device) performs the processing of S202 to S206. The processing of S202 to S206 is the same as the processing of S101 to S105 of the solenoid valve control according to the first embodiment. Therefore, the description of the processing of S202 to S206 will be omitted here.

Also in the solenoid valve control according to the second embodiment, filter processing is performed on the pressure fluctuation every shot (every energization pulse of the solenoid valve) to determine whether closing of the solenoid valve succeeds. Therefore, it is possible to more accurately and directly detect the valve closing success/failure of the solenoid valve as compared with a method of determining the valve closing success/failure of the solenoid valve simply based on whether the fuel pressure decreases or increases.

In addition, it is possible to drive the solenoid valve at the minimum current value, and it is possible to realize significant noise reduction and power saving. Furthermore, it is possible to detect closing of the solenoid valve by an existing circuit without a need to add a new control circuit. As a result, it is possible to significantly shorten the development period and to significantly reduce the cost.

3. Third Embodiment

Next, a solenoid valve control device according to a third embodiment of the present invention will be described. The solenoid valve control device according to the third embodiment of the present invention has the same configuration as the solenoid valve control device according to the first embodiment described above. The solenoid valve control device according to the third embodiment is different from the solenoid valve control device according to the first embodiment in control of the electromagnetic suction valve. Therefore, here, the control of the electromagnetic suction valve according to the third embodiment will be described, and the description of the common configuration of the ECU (solenoid valve control device), the high-pressure fuel pump, the electromagnetic suction valve, and the like will be omitted.

[Control of Electromagnetic Suction Valve]

Control processing of an electromagnetic suction valve 300 according to the third embodiment will be described with reference to FIG. 12.

Figure 12:
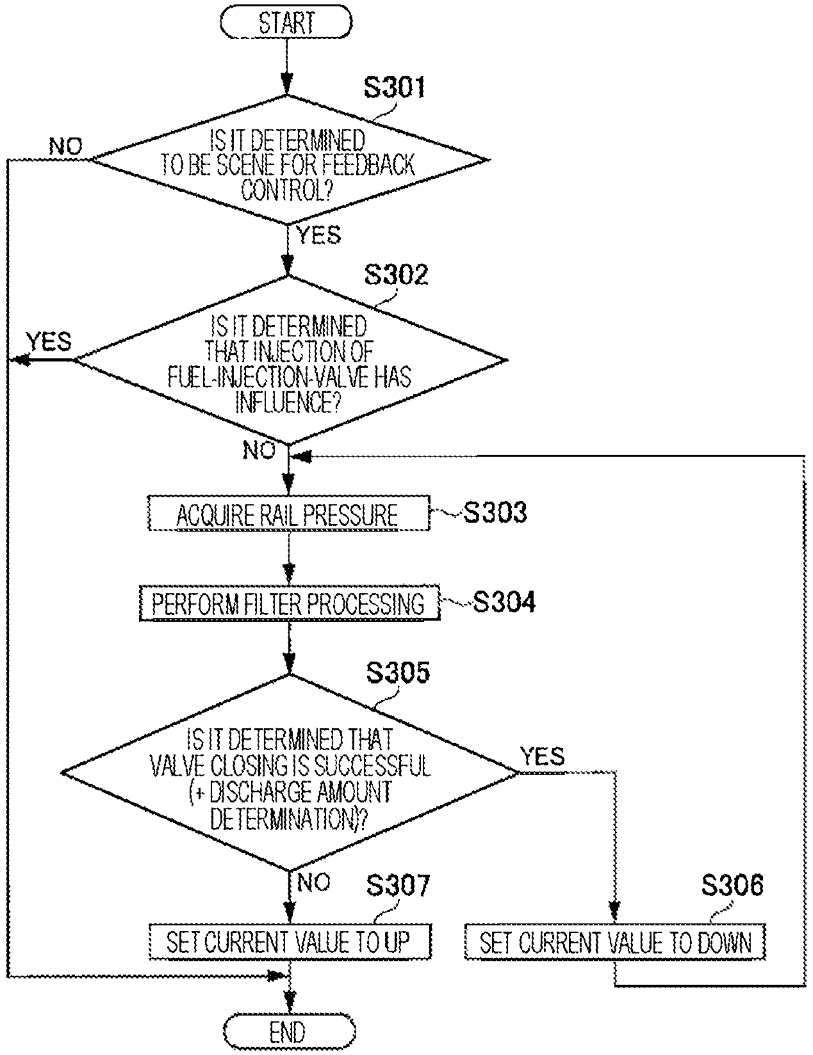
FIG. 12 is a flowchart of solenoid valve control in a high-pressure fuel pump according to a third embodiment of the present invention.

FIG. 12 is a flowchart of solenoid valve control according to the third embodiment.

First, the ECU 109 (solenoid valve control device) performs scene determination (S301). In this processing, whether or not to continue the main feedback control (processing of feeding whether or not closing of the electromagnetic suction valve succeeds back to the drive current value) is determined from the operation scene.

When it is determined in S301 that the scene is not a scene where the main feedback control is performed (NO in S301), the ECU 109 (solenoid valve control device) ends the control. Thus, the main feedback control is not performed. On the other hand, when it is determined in S301 that the scene is the scene where the main feedback control is performed (YES determination in S301), the ECU 109 (solenoid valve control device) performs injection influence determination of the fuel injection valve 105 (S302).

The discharge of fuel by the high-pressure fuel pump and the fuel injection by the fuel injection valve 105 are large factors having an influence on the fuel pressure of the common rail 129. Therefore, it is necessary to pay attention to the main feedback control in a scene where both overlap with each other.

Figure 13:
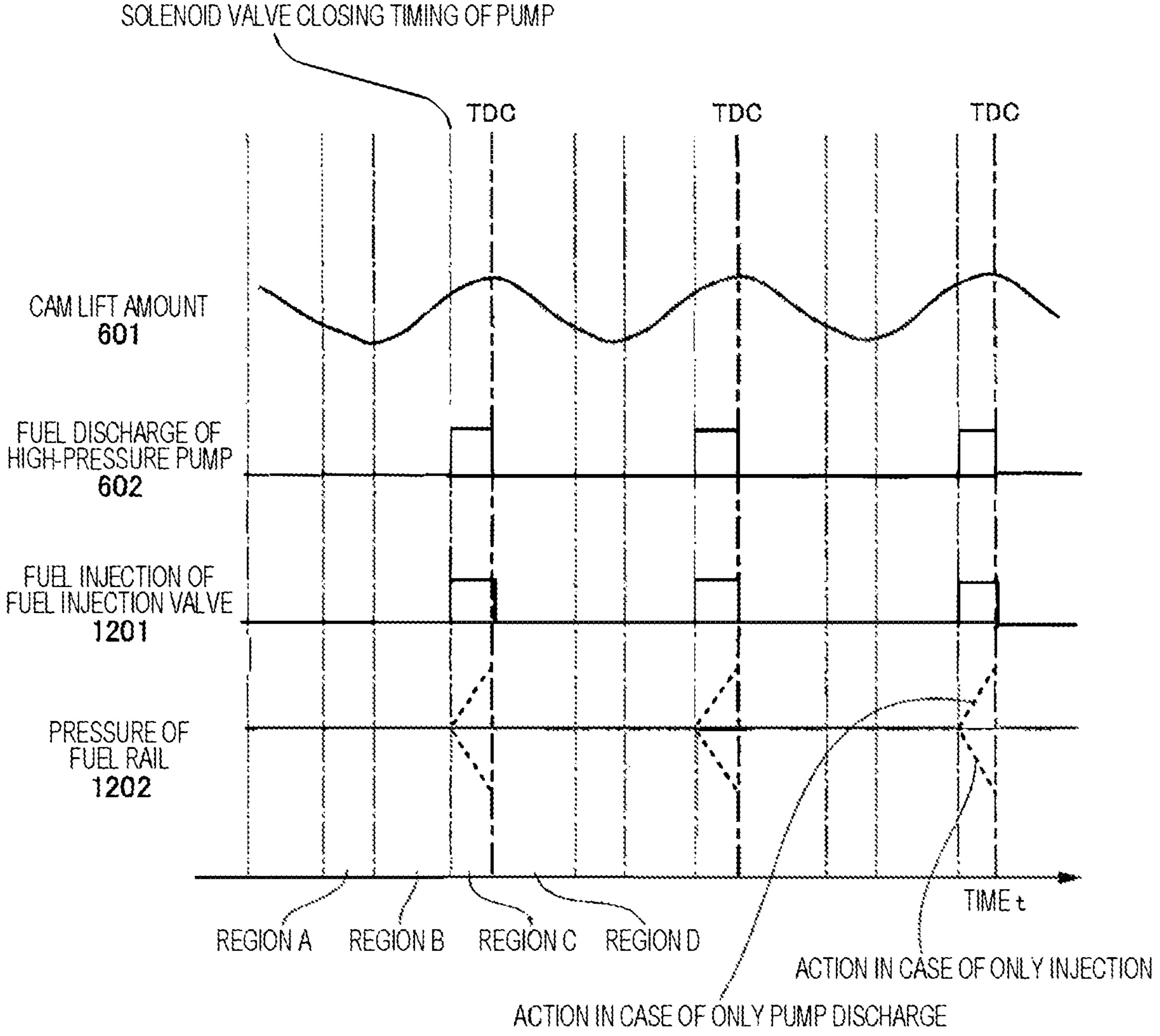
FIG. 13 is a diagram illustrating a relationship among fuel discharge of the high-pressure fuel pump, fuel injection of a fuel injection valve, fuel pressure of a common rail, and fuel pressure after filter processing according to the third embodiment of the present invention.

FIG. 13 is a diagram illustrating a relationship among fuel discharge of the high-pressure fuel pump, fuel injection of the fuel injection valve, fuel pressure of the common rail, and fuel pressure after filter processing according to the third embodiment of the present invention. As illustrated in FIG. 12, when the fuel discharge 602 of the high-pressure fuel pump 125 and fuel injection 1201 of the fuel injection valve 105 are performed at the same timing, the increase in the fuel pressure due to the fuel discharge 602 of the high-pressure fuel pump 125 is canceled by the decrease in the fuel pressure due to the fuel injection 1201 of the fuel injection valve 105. As a result, the fuel pressure 1202 in the common rail 129 does not change, and it becomes impossible to detect the valve closing of the electromagnetic suction valve 300 from the pressure fluctuation. In this case, the ECU 109 (solenoid valve control device) determines that the fuel injection 1201 by the fuel injection valve 105 has an influence on the feedback control.

Since the fuel pressure 1202 in the common rail 129 has pulsation, a scene in which the timings of the fuel discharge 602 and the fuel injection 1201 completely overlap as illustrated in FIG. 13 is not actually assumed. However, in a scene where the discharge and the injection overlap as much as possible, whether the main feedback control can be applied is examined in consideration of the setting of the threshold value, the detection window, and the like while checking the actual pressure action. The region where the high-pressure fuel pump 125 can discharge the fuel is only a range where the plunger 302 rises (from the cam bottom dead center to the top dead center). Therefore, when the fuel injection pulse slightly overlaps the range in which the plunger 302 rises, it may be determined that the fuel injection by the fuel injection valve 105 has an influence on the main feedback control.

When it is determined in S302 that the fuel injection by the fuel injection valve 105 has an influence on the feedback control (YES determination in S302), the ECU 109 (solenoid valve control device) ends the control. Thus, the main feedback control is not performed.

On the other hand, when it is determined in S302 that the fuel injection by the fuel injection valve 105 does not have an influence on the main feedback control (YES determination in S302), the ECU 109 (solenoid valve control device) performs processing of S303 to S307. The processing of S303 to S307 is the same as the processing of S101 to S105 of the solenoid valve control according to the first embodiment. Therefore, the description of the processing of S303 to S307 will be omitted here.

Also in the solenoid valve control according to the third embodiment, filter processing is performed on the pressure fluctuation every shot (every energization pulse of the solenoid valve) to determine whether closing of the solenoid valve succeeds. Therefore, it is possible to more accurately and directly detect the valve closing success/failure of the solenoid valve as compared with a method of determining the valve closing success/failure of the solenoid valve simply based on whether the fuel pressure decreases or increases.

In addition, it is possible to drive the solenoid valve at the minimum current value, and it is possible to realize significant noise reduction and power saving. Furthermore, it is possible to detect closing of the solenoid valve by an existing circuit without a need to add a new control circuit. As a result, it is possible to significantly shorten the development period and to significantly reduce the cost.

4. Fourth Embodiment

Next, a solenoid valve control device according to a fourth embodiment of the present invention will be described. The solenoid valve control device according to the fourth embodiment of the present invention has the same configuration as the solenoid valve control device according to the first embodiment described above. The solenoid valve control device according to the fourth embodiment is different from the solenoid valve control device according to the first embodiment in that a fuel injection valve is applied as the solenoid valve. Here, control of the fuel injection valve according to the fourth embodiment will be described, and description of common configurations of the ECU (solenoid valve control device), the fuel injection valve, and the like will be omitted.

[Control of Electromagnetic Suction Valve]

Control processing of the fuel injection valve 105 according to the fourth embodiment will be described with reference to FIG. 14.

Figure 14:
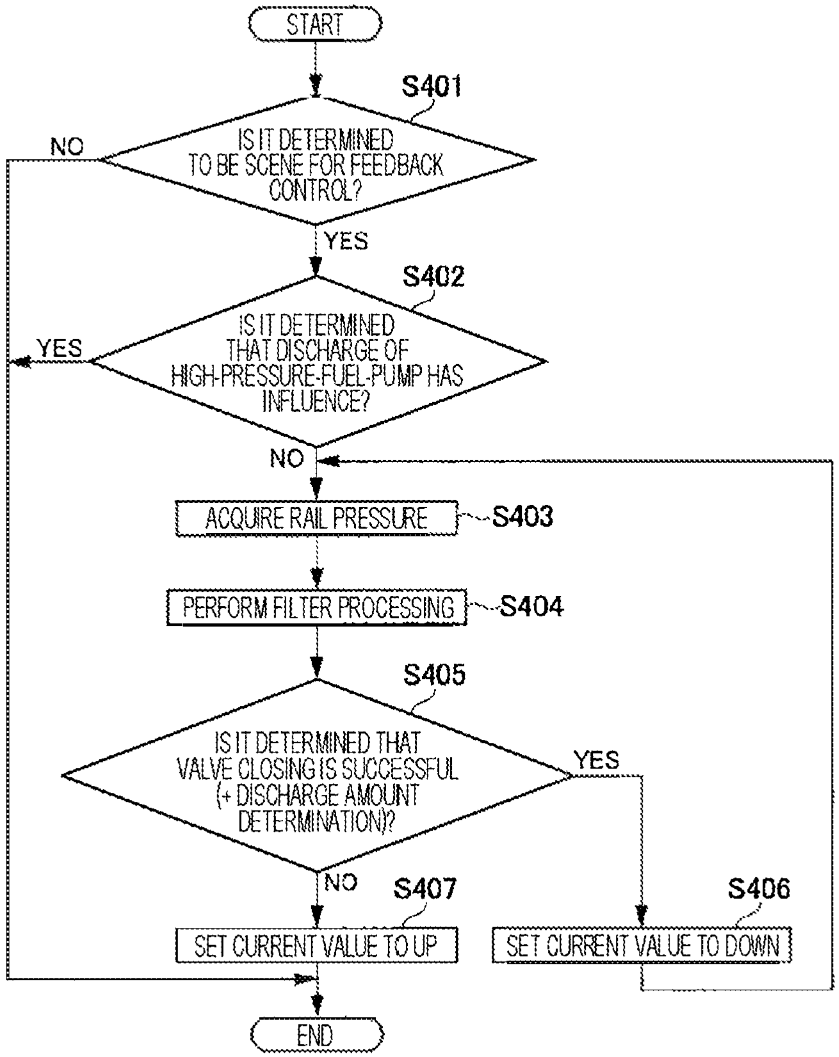
FIG. 14 is a flowchart of fuel injection valve control according to a fourth embodiment of the present invention.

FIG. 14 is a flowchart of solenoid valve control according to the fourth embodiment.

When the electromagnetic suction valve 300 of the high-pressure fuel pump 125 is successfully closed, the fuel pressure in the common rail 129 increases. On the other hand, when the fuel injection valve 105 is successfully closed, the fuel pressure in the common rail 129 decreases. As described above, since the electromagnetic suction valve 300 of the high-pressure fuel pump 125 and the fuel injection valve 105 have a true inverse relationship, a portion of the solenoid valve control is different.

First, the ECU 109 (solenoid valve control device) performs scene determination (S401). In this processing, whether or not to continue the main feedback control (processing of feeding whether or not closing of the fuel injection valve succeeds back to the drive current value) is determined from the operation scene. The driving scene is the same as that in the second embodiment described above.

When it is determined in S401 that the scene is not a scene where the main feedback control is performed (NO in S401), the ECU 109 (solenoid valve control device) ends the control. Thus, the main feedback control is not performed. On the other hand, when it is determined in S401 that the scene is the scene where the main feedback control is performed (YES determination in S401), the ECU 109 (solenoid valve control device) performs discharge influence determination of the high-pressure fuel pump 125 (S402).

As described above, when the fuel discharge of the high-pressure fuel pump 125 and fuel injection of the fuel injection valve 105 are performed at the same timing, the increase in the fuel pressure due to the fuel discharge of the high-pressure fuel pump 125 is canceled by the decrease in the fuel pressure due to the fuel injection of the fuel injection valve 105. As a result, the fuel pressure in the common rail 129 does not change, and it becomes impossible to detect the valve closing of the fuel injection valve 105 from the pressure fluctuation. In this case, the ECU 109 (solenoid valve control device) determines that the fuel discharge by the high-pressure fuel pump 125 has an influence on the main feedback control. For example, when the fuel injection pulse slightly overlaps the range from the cam top dead center to the bottom dead center, it may be determined that the fuel discharge by the high-pressure fuel pump 125 has an influence on the main feedback control.

When it is determined in S402 that the fuel discharge by the high-pressure fuel pump 125 has an influence on the feedback control (YES determination in S402), the ECU 109 (solenoid valve control device) ends the control. Thus, the main feedback control is not performed.

On the other hand, when it is determined in S402 that the fuel discharge by the high-pressure fuel pump 125 does not have an influence on the main feedback control (YES determination in S402), the ECU 109 (solenoid valve control device) performs processing of S403 and S404. The processing of S403 and S404 is the same as the processing of S101 and S102 of the solenoid valve control according to the first embodiment. Therefore, the description of the processing of S403 and S404 will be omitted here.

After the processing of S404, the ECU 109 (solenoid valve control device) determines whether or not closing of the fuel injection valve 105 succeeds by comparing the pressure data after the filter processing with a threshold value set in advance (S405). When the fuel injection valve 105 is successfully closed, the fuel pressure in the common rail 129 drops. Therefore, the threshold value is set to a negative value, and it is determined that the valve is successfully closed when the fuel pressure data after the filter processing is smaller than the threshold value. When the fuel pressure data after the filter process is equal to or greater than the threshold value, it is determined that the valve closing has failed.

When it is determined in S405 that the valve is successfully closed (YES in S405), the ECU 109 (solenoid valve control device) determines that the current current setting value has a margin. Then, the ECU 109 (solenoid valve control device) corrects the current setting value to a value lower than a setting value at the current time (S406). Then, the ECU 109 (solenoid valve control device) acquires fuel pressure data again. That is, the ECU 109 (solenoid valve control device) returns the process to S403.

On the other hand, when it is determined in S405 that the valve closing has failed (NO in S405), the ECU 109 (solenoid valve control device) determines that the current current setting value is low. Then, the ECU 109 (solenoid valve control device) corrects the current setting value to a value higher than the setting value at the current time (S407). Then, the ECU 109 (solenoid valve control device) determines that the current setting value corrected in the processing of S407 is the minimum current value, and then ends the control.

The conversion from the injection flow rate to the pressure fluctuation can be calculated from the pressure, the volume, the fuel physical properties, and the like by using an expression of the compressible fluid. Conversely, the injection flow rate of the fuel injection valve can be calculated from the change amount of the measurement signal (pressure data after difference filtering processing). In the processing of S405, the injection flow rate of the fuel injection valve may be calculated, and it may be determined whether the current setting value is corrected to a low value or a high value from the calculated injection flow rate. For example, when the calculated injection flow rate of the fuel injection valve is less than a predetermined specific value, the same determination (YES determination) as the case where the valve is successfully closed is made. On the other hand, when the calculated injection flow rate of the fuel injection valve is equal to or greater than the specific value, the same determination (NO determination) as the case where the valve closing has failed is made.

Also in the solenoid valve control according to the fourth embodiment, filter processing is performed on the pressure fluctuation every shot (every energization pulse of the solenoid valve) to determine whether closing of the solenoid valve succeeds. Therefore, it is possible to more accurately and directly detect the valve closing success/failure of the solenoid valve as compared with a method of determining the valve closing success/failure of the solenoid valve simply based on whether the fuel pressure decreases or increases.

In addition, it is possible to drive the solenoid valve at the minimum current value, and it is possible to realize significant noise reduction and power saving. Furthermore, it is possible to detect closing of the solenoid valve by an existing circuit without a need to add a new control circuit. As a result, it is possible to significantly shorten the development period and to significantly reduce the cost.

5. Summary

As described above, the solenoid valve control device (ECU 109) according to the above-described embodiment controls opening and closing of the solenoid valve in the internal combustion engine system including the fuel pump (high-pressure fuel pump 125) including the plunger (plunger 302) that moves up and down with the rotation of the pump drive cam (pump drive cam 301) to increase or decrease the volume of the pressurizing chamber (pressurizing chamber 311), the solenoid valve (electromagnetic suction valve 300) for sucking the fuel into the pressurizing chamber, and the discharge valve (discharge valve 310) for discharging the fuel in the pressurizing chamber, and the fuel rail (common rail 129) for accumulating the fuel discharged by the fuel pump. The solenoid valve control device includes the control unit (microcomputer 220) that determines whether or not closing of the solenoid valve has succeeded based on fuel pressure of the fuel rail, or calculates a discharge amount by closing the solenoid valve based on the fuel pressure of the fuel rail. This makes it possible to detect the closing of the solenoid valve, which is the motion of the valve body in response to the drive command, without adding a special circuit such as a low-pass filter circuit or an operational amplifier circuit.

In addition, the control unit (microcomputer 220) of the solenoid valve control device (ECU 109) according to the above-described embodiment determines whether closing of the solenoid valve (electromagnetic suction valve 300) succeeds or calculates the discharge amount by closing the solenoid valve, based on the measurement signal output from the fuel pressure sensor (fuel pressure sensor 126) attached to the fuel rail (common rail 129). As a result, it is possible to easily acquire the fuel pressure in the fuel rail.

In addition, the control unit (microcomputer 220) of the solenoid valve control device (ECU 109) according to the above-described embodiment performs filter processing on the measurement signal output from the fuel pressure sensor (fuel pressure sensor 126), and compares the filtered measurement signal with a predetermined threshold value to determine whether closing of the solenoid valve (electromagnetic suction valve 300) succeeds or calculate the discharge amount by closing the solenoid valve. As a result, it is possible to improve the accuracy of the valve closing success or failure of the solenoid valve. In addition, it is possible to improve the accuracy of the calculated discharge amount by closing the solenoid valve.

In addition, the control unit (microcomputer 220) of the solenoid valve control device (ECU 109) according to the above-described embodiment determines that the closing of the solenoid valve (electromagnetic suction valve 300) has succeeded when the change amount of the measurement signal output from the fuel pressure sensor (fuel pressure sensor 126) is greater than the predetermined threshold value, and determines that the closing of the solenoid valve has failed when the change amount is equal to or smaller than the threshold value. As a result, it is possible to easily detect the closing of the solenoid valve, which is the motion of the valve body in response to the drive command.

In addition, the control unit (microcomputer 220) of the solenoid valve control device (ECU 109) according to the above-described embodiment calculates the discharge amount by closing the solenoid valve (electromagnetic suction valve 300) based on the change amount of the measurement signal output from the fuel pressure sensor (fuel pressure sensor 126). As a result, it is possible to easily detect the discharge amount by the valve closing. The discharge amount by the valve closing corresponds to the motion of the valve body in response to the drive command.

In addition, the control unit (microcomputer 220) of the solenoid valve control device (ECU 109) according to the above-described embodiment corrects the peak value of the drive current supplied to the solenoid valve to a value lower than the current setting value when determining that the closing of the solenoid valve (electromagnetic suction valve 300) has succeeded, and corrects the peak value of the drive current supplied to the solenoid valve to a value higher than the current setting value when determining that the closing of the solenoid valve has failed. As a result, it is possible to drive the solenoid valve at the minimum current value, and it is possible to realize noise reduction and power saving.

In addition, the control unit (microcomputer 220) of the solenoid valve control device (ECU 109) according to the above-described embodiment corrects the peak value of the drive current supplied to the solenoid valve to the value lower than the current setting value when the discharge amount of fuel by closing the solenoid valve (electromagnetic suction valve 300) is greater than the predetermined value, and corrects the peak value of the drive current supplied to the solenoid valve to a value higher than the current setting value when the amount of fuel discharged by closing the solenoid valve is equal to or smaller than the predetermined value. Thus, it is possible to drive the solenoid valve at the minimum current value, and it is possible to realize noise reduction and power saving.

In addition, the control unit (microcomputer 220) of the solenoid valve control device (ECU 109) according to the above-described embodiment determines whether or not closing of the solenoid valve (electromagnetic suction valve 300) succeeds for each energization pulse of the solenoid valve or calculates the discharge amount by the valve closing for each energization pulse of the solenoid valve, based on the fuel pressure of the fuel rail (common rail 129). As a result, it is possible to directly detect the valve closing success/failure of the solenoid valve as compared with a method of determining the valve closing success/failure of the solenoid valve simply based on whether the fuel pressure decreases or increases.

In addition, the control unit (microcomputer 220) of the solenoid valve control device (ECU 109) according to the above-described embodiment is disposed on the downstream side of the fuel rail (common rail 129), and when the fuel injection pulse applied to the fuel injection valve (fuel injection valve 105) that injects fuel into the combustion chamber (combustion chamber 121) of the engine is within the setting range, determines whether closing of the solenoid valve (electromagnetic suction valve 300) succeeds based on the fuel pressure of the fuel rail, or calculates the discharge amount by closing the solenoid valve, and performs the solenoid valve control of controlling the valve closing or the valve opening operation of the solenoid valve based on the determination result or the calculation result. As a result, it is possible to detect whether or not the solenoid valve is closed or calculate the discharge amount by the valve closing in consideration of the fuel injection timing by the fuel injection valve. As a result, it is possible to improve the accuracy of the determination of whether or not closing of the solenoid valve has succeeded, or the calculation value of the discharge amount by closing the valve. In addition, since the solenoid valve control is performed based on whether or not the solenoid valve detected with high accuracy is closed or the discharge amount due to the valve closing calculated with high accuracy, the accuracy of the solenoid valve driving at the minimum current value can be improved.

The control unit (microcomputer 220) of the solenoid valve control device (ECU 109) according to the above-described embodiment performs the solenoid valve control when determining that the injection pulse applied to the fuel injection valve (fuel injection valve 105) does not interfere with the fuel discharge timing of the fuel pump (high-pressure fuel pump 125). As a result, when the fuel pressure in the fuel rail changes, it is possible to detect whether the solenoid valve is successfully closed or calculate the discharge amount by closing the valve. As a result, it is possible to improve the accuracy of determination of whether or not closing of the solenoid valve has succeeded or calculation of the discharge amount by the valve closing. In addition, since the solenoid valve control is performed based on whether or not the solenoid valve detected with high accuracy is closed or the discharge amount due to the valve closing calculated with high accuracy, the accuracy of the solenoid valve driving at the minimum current value can be improved.

In addition, the control unit (microcomputer 220) of the solenoid valve control device (ECU 109) according to the above-described embodiment performs a solenoid valve diagnosis process of determining whether or not closing of the solenoid valve (electromagnetic suction valve 300) succeeds or calculating the discharge amount by closing the solenoid valve based on the fuel pressure of the fuel rail (common rail 129) when the engine performs the idle operation. Accordingly, it is possible to reduce noise during an idle operation.

In addition, the control unit (microcomputer 220) of the solenoid valve control device (ECU 109) according to the above-described embodiment performs a solenoid valve diagnosis process of determining whether or not closing of the solenoid valve (electromagnetic suction valve 300) succeeds or calculating the discharge amount by closing the solenoid valve based on the fuel pressure of the fuel rail (common rail 129) in a scene where the engine can be normally operated. As a result, since the solenoid valve diagnosis processing can be performed in a scene where the disturbance is small and the change in the fuel pressure and the discharge amount is small, it is possible to improve the accuracy of determination of the valve closing success or failure or calculation of the discharge amount by the valve closing.

In addition, the solenoid valve control device (ECU 109) according to the above-described embodiment controls opening and closing of the fuel injection valve in the internal combustion engine system including the fuel pump (high-pressure fuel pump 125) including the plunger (plunger 302) that moves up and down with the rotation of (pump drive cam 301) to increase or decrease the volume of the pressurizing chamber (pressurizing chamber 311), the solenoid valve (electromagnetic suction valve 300) for sucking the fuel into the pressurizing chamber, and the discharge valve (discharge valve 310) for discharging the fuel in the pressurizing chamber, the fuel rail (common rail 129) for accumulating the fuel discharged by the fuel pump, and the fuel injection valve (fuel injection valve 105) that injects the fuel to the combustion chamber (combustion chamber 121) of the engine. The solenoid valve control device includes the control unit (microcomputer 220) that determines whether or not closing of the fuel injection valve succeeds based on fuel pressure of the fuel rail, or calculates a discharge amount by closing the fuel injection valve based on the fuel pressure of the fuel rail. This makes it possible to detect the closing of the fuel injection valve, which is the motion of the valve body in response to the drive command, without adding a special circuit such as a low-pass filter circuit or an operational amplifier circuit.

Hitherto, the solenoid valve control device according to the embodiment of the present invention has been described above including the operational effects thereof.

However, the solenoid valve control device in the present invention is not limited to the above-described embodiment, and various modifications can be made without departing from the gist of the invention described in the claims.

The above-described embodiments have been described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

For example, the above-described embodiments are applied to a normally open type solenoid valve in which the valve body is opened when no current flows in the solenoid and the valve body is closed when a current flows in the solenoid, as the solenoid valve. However, the electronic valve control device according to the present invention may be applied to a normally closed type solenoid valve in which a valve body is opened when a current flows through a solenoid and the valve body is closed when no current flows through the solenoid.

REFERENCE SIGNS LIST

- 101 internal combustion engine
- 102 piston
- 103 intake valve
- 104 exhaust valve
- 105 fuel injection valve
- 109 ECU
- 110 intake pipe
- 111 exhaust pipe
- 121 combustion chamber
- 123 fuel tank
- 124 low-pressure fuel pump
- 125 high-pressure fuel pump
- 126 fuel pressure sensor
- 128 exhaust cam
- 129 common rail
- 201 sensors
- 202 input signal
- 203 input circuit
- 204 A/D conversion unit
- 205 CPU
- 206 signal line
- 210 output circuit
- 211 control signal
- 212 actuators
- 220 microcomputer
- 300 electromagnetic suction valve
- 301 pump drive cam
- 302 plunger
- 303 valve body
- 303*a* abutment piece
- 304 anchor
- 305 solenoid
- 306 fixing portion (magnetic core)
- 307 seat portion
- 308 stopper
- 309 first spring
- 310 discharge valve
- 311 pressurizing chamber
- 315 second spring
- 321 communication port
- 322 outflow port
- 323 casing
- 325 inflow port
- 355 relief valve

The invention claimed is:

1. A solenoid valve control device that controls opening and closing of a solenoid valve in an internal combustion engine system including a fuel pump and a fuel rail that accumulates fuel discharged by the fuel pump, the fuel pump including a plunger that increases or decreases a volume of a pressurizing chamber by moving up and down with rotation of a pump drive cam, the solenoid valve for sucking fuel into the pressurizing chamber, and a discharge valve for discharging fuel in the pressurizing chamber, the solenoid valve control device comprising:

a control unit that determines whether or not closing of the solenoid valve has succeeded based on fuel pressure of the fuel rail, or calculates a discharge amount by closing the solenoid valve based on the fuel pressure of the fuel rail;

wherein the control unit determines whether or not the closing of the solenoid valve has succeeded or calculates the discharge amount by closing the solenoid valve, based on a measurement signal output from a fuel pressure sensor attached to the fuel rail; and wherein the control unit determines whether or not the closing of the solenoid valve has succeeded or calculates the discharge amount by closing the solenoid valve, by performing filter processing on the measurement signal output from the fuel pressure sensor and comparing the measurement signal after the filter processing with a predetermined threshold value.

2. The solenoid valve control device according to claim 1, wherein the control unit determines that the closing of the solenoid valve has succeeded when a change amount of the measurement signal output from the fuel pressure sensor is greater than a predetermined threshold value, and determines that the closing of the solenoid valve has failed when the change amount is equal to or smaller than the threshold value.

3. The solenoid valve control device according to claim 1, wherein the control unit calculates the discharge amount by closing the solenoid valve based on the change amount of the measurement signal output from the fuel pressure sensor.

4. The solenoid valve control device according to claim 1, wherein when a fuel injection pulse applied to a fuel injection valve that is disposed on a downstream side of the fuel rail and injects fuel into a combustion chamber of an engine is within a setting range, the control unit determines whether or not the closing of the solenoid valve has succeeded or calculates the discharge amount by closing the solenoid valve, based on fuel pressure of the fuel rail, and performs solenoid valve control of controlling a valve closing or valve opening operation of the solenoid valve based on a determination result or a calculation result.

5. A solenoid valve control device that controls opening and closing of a solenoid valve in an internal combustion engine system including a fuel pump and a fuel rail that accumulates fuel discharged by the fuel pump, the fuel pump including a plunger that increases or decreases a volume of a pressurizing chamber by moving up and down with rotation of a pump drive cam, the solenoid valve for sucking fuel into the pressurizing chamber, and a discharge valve for discharging fuel in the pressurizing chamber, the solenoid valve control device comprising:

a control unit that determines whether or not closing of the solenoid valve has succeeded based on fuel pressure of the fuel rail, or calculates a discharge amount by closing the solenoid valve based on the fuel pressure of the fuel rail; and wherein the control unit corrects a peak value of a drive current supplied to the solenoid valve to a value lower than a setting value at a current time when determining that the closing of the solenoid valve has succeeded, and corrects the peak value of the drive current supplied to the solenoid valve to a value higher than the setting value at the current time when determining that the closing of the solenoid valve has failed.

6. The solenoid valve control device according to claim 5, wherein the control unit corrects a peak value of a drive current supplied to the solenoid valve to a value lower than a setting value at a current time when the discharge amount of the fuel by closing the solenoid valve is greater than a predetermined value, and corrects the peak value of the drive current supplied to the solenoid valve to a value higher than the setting value at the current time when the discharge amount of the fuel by closing the solenoid valve is equal to or smaller than the predetermined value.

7. The solenoid valve control device according to claim 5, wherein the control unit determines whether or not the closing of the solenoid valve has succeeded for each energization pulse of the solenoid valve or calculates the discharge amount by closing the valve for each energization pulse of the solenoid valve, based on the fuel pressure of the fuel rail.

8. The solenoid valve control device according to claim 4, wherein the control unit performs the solenoid valve control when determining that the injection pulse applied to the fuel injection valve does not interfere with fuel discharge timing of the fuel pump.

9. The solenoid valve control device according to claim 4, wherein when the engine is idling, the control unit performs solenoid valve diagnosis processing of determining whether or not the closing of the solenoid valve has succeeded or calculating the discharge amount by closing the solenoid valve, based on the fuel pressure of the fuel rail.

10. The solenoid valve control device according to claim 4, wherein the control unit performs solenoid valve diagnosis processing of determining whether or not the closing of the solenoid valve has succeeded or calculating the discharge amount by closing the solenoid valve, based on the fuel pressure of the fuel rail in a scene where the engine is allowed to be normally operated.

11. A solenoid valve control device that controls opening and closing of a fuel injection valve in an internal combustion engine system including a fuel pump, a fuel rail that accumulates fuel discharged by the fuel pump, and the fuel injection valve that is disposed on a downstream side of the fuel rail and injects fuel into a combustion chamber of an engine, the fuel pump including a plunger that increases or decreases a volume of a pressurizing chamber by moving up and down with rotation of a pump drive cam, a solenoid valve for sucking fuel into the pressurizing chamber, and a discharge valve for discharging fuel in the pressurizing chamber, the solenoid valve control device comprising a control unit that determines whether or not closing of the fuel injection valve succeeds based on fuel pressure of the fuel rail, or calculates a discharge amount by closing the fuel injection valve based on the fuel pressure of the fuel rail.

* * * * *